(12) United States Patent
Nishi et al.

(10) Patent No.: US 10,176,838 B2
(45) Date of Patent: Jan. 8, 2019

(54) OPTICAL DISC DEVICE

(71) Applicant: Sony Corporation, Tokyo (JP)

(72) Inventors: Noriaki Nishi, Kanagawa (JP);
Kimihiro Saito, Tokyo (JP); Nobuhiko Ando, Tokyo (JP); Fumiaki Nakano, Saitama (JP); Yuuichi Suzuki, Kanagawa (JP); Hiroaki Nakagawa, Tokyo (JP); Tetsuya Inoue, Kanagawa (JP); Yutaka Tentaku, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/737,771

(22) PCT Filed: Apr. 20, 2016

(86) PCT No.: PCT/JP2016/002104
§ 371 (c)(1),
(2) Date: Dec. 19, 2017

(87) PCT Pub. No.: WO2016/208104
PCT Pub. Date: Dec. 29, 2016

(65) Prior Publication Data
US 2018/0315448 A1    Nov. 1, 2018

(30) Foreign Application Priority Data

Jun. 26, 2015    (JP) ................ 2015-1285892

(51) Int. Cl.
*G11B 7/09*    (2006.01)
*G11B 20/10*    (2006.01)
*G11B 7/1381*    (2012.01)

(52) U.S. Cl.
CPC .......... *G11B 7/0938* (2013.01); *G11B 7/0929* (2013.01); *G11B 20/10046* (2013.01); *G11B 7/1381* (2013.01)

(58) Field of Classification Search
CPC ................ G11B 7/0917; G11B 7/0943; G11B 20/10009; G11B 7/1353; G11B 7/135; G11B 2007/13722; G11B 7/1378
(Continued)

(56) References Cited

U.S. PATENT DOCUMENTS 8,184,509 B2*   5/2012   Nakamura ........... G11B 7/0906
                                                                              369/109.01
2005/0094509 A1   5/2005   Nagura
2014/0341007 A1   11/2014   Sano et al.

FOREIGN PATENT DOCUMENTS

JP          05-242512 A    9/1993
JP          08-249664 A    9/1996
(Continued)

OTHER PUBLICATIONS

International Search Report and Written Opinion and English translation thereof dated Aug. 2, 2016 in connection with International Application No. PCT/JP2016/002104.
(Continued)

*Primary Examiner* — Nabil Z Hindi
(74) *Attorney, Agent, or Firm* — Wolf, Greenfield & Sacks, P.C.

(57) ABSTRACT

A cross section of a luminous flux of returning light from a disc is split into a plurality of regions, and an operation is performed so that a weighting of a light amount of a region which has favorable symmetry in a radial direction and is formed on a circumference of an ellipse among the split regions is increased. Further, a lens shift detection signal is formed, and a lens shift detection signal is canceled from a push-pull signal.

7 Claims, 25 Drawing Sheets

(58) Field of Classification Search
USPC ......... 369/124.01, 124.03, 118, 120, 112.01,
369/112.04, 112.08, 112.1, 112.15,
369/112.23, 44.34, 44.41
See application file for complete search history.

(56) References Cited

FOREIGN PATENT DOCUMENTS

| | | |
|---|---|---|
| JP | 2002-025092 A | 1/2002 |
| JP | 2002-056556 A | 2/2002 |
| JP | 2005-085352 A | 3/2005 |
| JP | 2005-135539 A | 5/2005 |
| JP | 2006-099934 A | 4/2006 |
| JP | 2008-135151 A | 6/2008 |
| JP | 2015-057748 A | 3/2015 |
| WO | WO 2014/057674 A1 | 4/2014 |
| WO | WO 2015/022773 A1 | 2/2015 |

OTHER PUBLICATIONS

International Preliminary Report on Patentability and English translation thereof dated Jan. 4, 2018 in connection with International Application No. PCT/JP2016/002104.

\* cited by examiner

FIG. 2
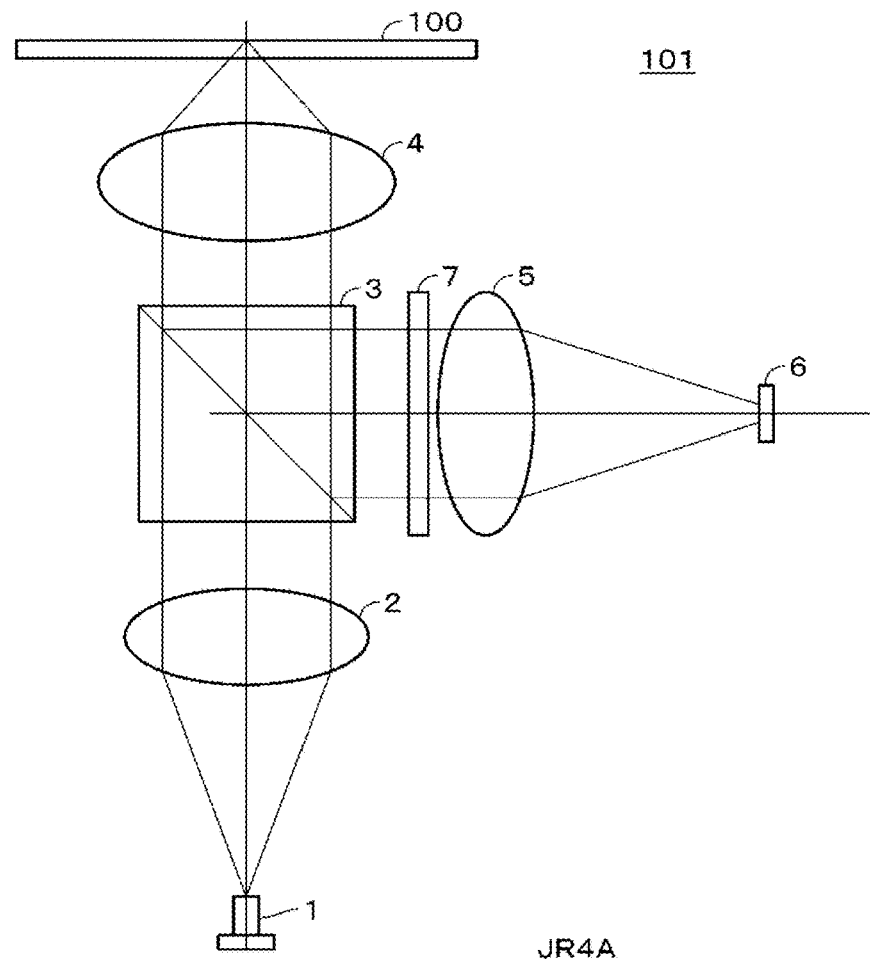
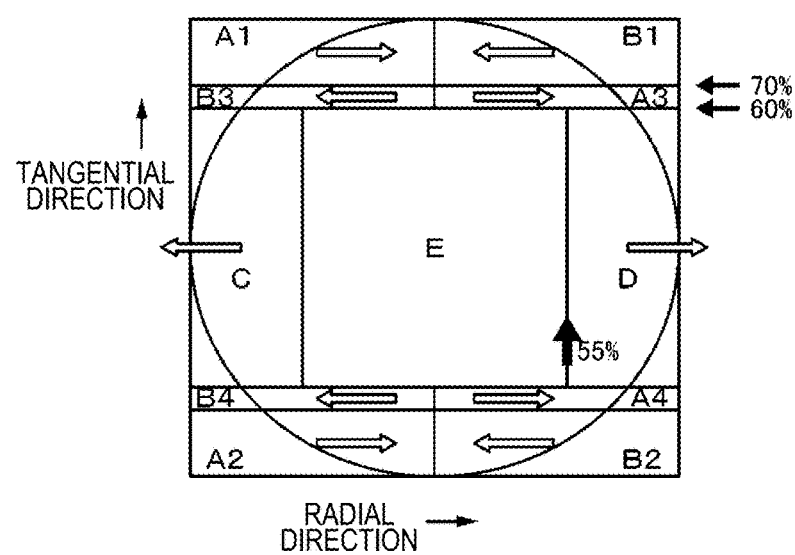

FIG. 13
A
[RF/PushPull DETECTION SYSTEM]
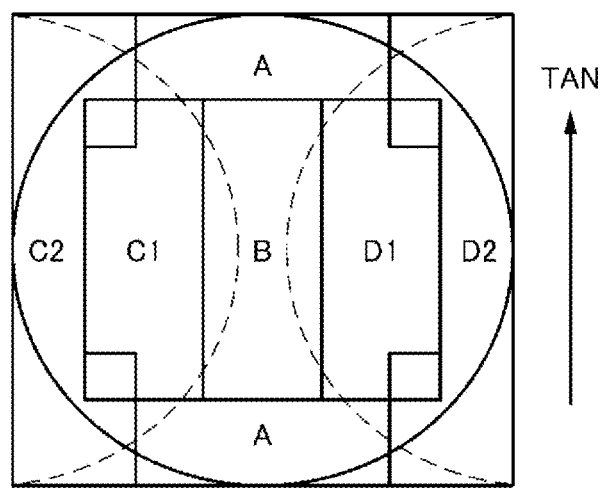
B
[LensShift DETECTION SYSTEM]
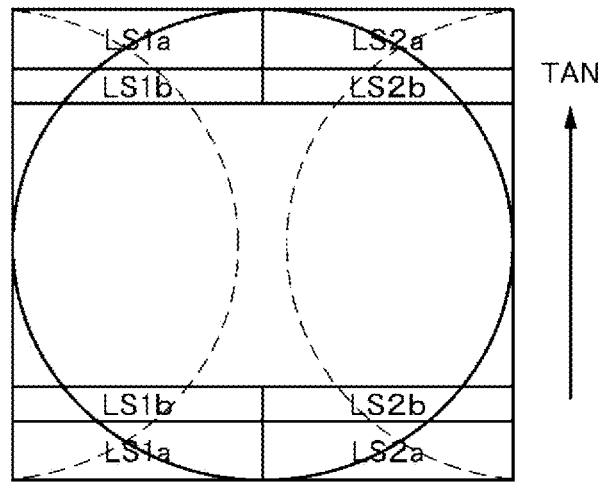

FIG. 25
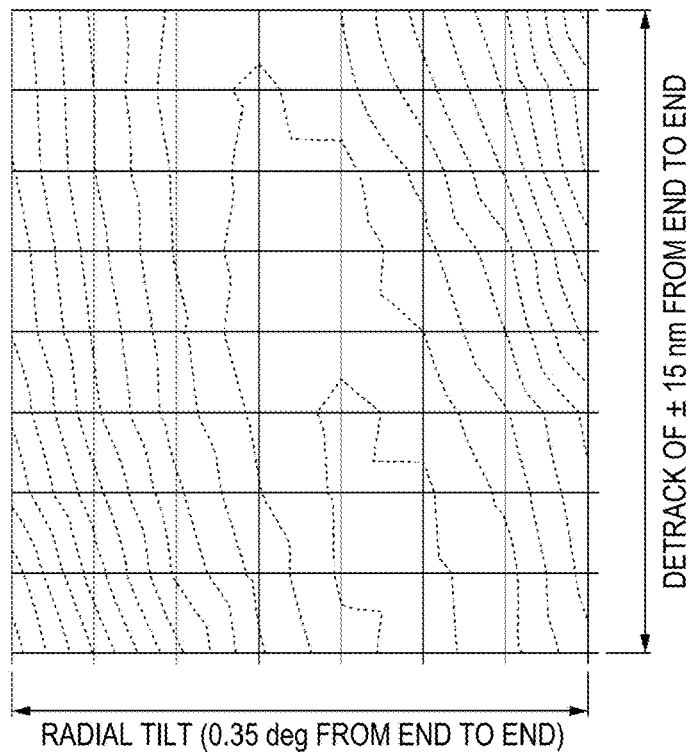
A
RADIAL TILT (0.35 deg FROM END TO END)
DETRACK OF ± 15 nm FROM END TO END
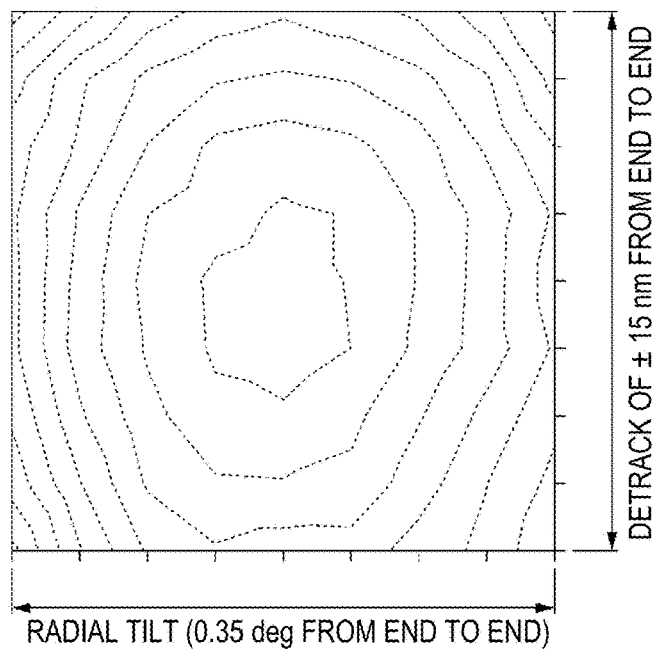
B
RADIAL TILT (0.35 deg FROM END TO END)
DETRACK OF ± 15 nm FROM END TO END

OPTICAL DISC DEVICE

CROSS REFERENCE TO RELATED APPLICATIONS

This application claims the benefit under 35 U.S.C. § 371 as a U.S. National Stage Entry of International Application No. PCT/JP2016/002104, filed in the Japanese Patent Office as a Receiving Office on Apr. 20, 2016, which claims priority to Japanese Patent Application Number JP2015-128592, filed in the Japanese Patent Office on Jun. 26, 2015, each of which is hereby incorporated by reference in its entirety.

TECHNICAL FIELD

The present disclosure relates to an optical disc device which performs at least one of recording and reproducing of data on an optical disc.

BACKGROUND ART

As a method of increasing a capacity of an optical disc, there are a method of increasing a recording density and a multilayering method. Further, as a method of increasing the recording density, there are a method of decreasing a channel bit length, that is, a mark length, and increasing the density in a linear-density direction and a method of narrowing a track pitch. However, if the density is increased in the linear-density direction, a problem in which inter-symbol interference is increased occurs. Further, if the track pitch is narrowed, leak-in (adjacent track crosstalk) of information from an adjacent track is increased, and quality required for a tracking error signal and a characteristic required for a tracking servo are degraded.

Methods for reducing the adjacent track crosstalk (hereinafter simply referred to as "crosstalk") have been proposed. Techniques of reducing influence of the crosstalk by spatially splitting reflected light from an optical recording medium into three in a track width direction, detecting each of the three into which the light is split, multiplying (weighting) the detection signal by a constant, and performing an addition operation are disclosed in Patent Literatures 1 and 2. Further, a technique capable of emphasizing and reproducing a reproduction signal of a small recording mark by further performing weighting in a beam traveling direction has been suggested in Patent Literature 1 as an idea.

Further, in the case of multilayering, in order to secure a sufficient recording light amount and a reproducing light amount for each layer, it is effective to keep coupling efficiency of an optical system high using only one beam in an outward path. A push-pull technique (abbreviated as a "PP technique") has been known since the past as a method of detecting a tracking error using only one beam in an optical disc device which performs recording and/or reproducing on an optical disc having a groove structure on an optical disc recording surface, and an advanced push-pull technique (abbreviated as "APP technique") disclosed in Patent Literature 3 and the like have been known as a method of suppressing an offset of a tracking error signal obtained by the push-pull technique which is caused by scrolling of an objective lens. In the case of a one-beam PP technique, the offset of the tracking error signal occurs at a boundary portion between an already recorded region (referred to as a "recorded region") and a region in which recording is not performed yet (referred to as a "non-recorded region"). The offset in the recording boundary occurs when a reflectance distribution of the recording boundary is asymmetric to a track, and it becomes an amplitude grating with a period coarser than that of a track and diffracts a light beam collected on an optical disc.

Due to the occurrence of the offset, a recording characteristic and a reproducing characteristic deteriorate, and in the least favorable case, a tracking servo is not performed. In order to suppress such an offset, a technique of performing focus control such that an offset amount of a tracking error signal is adjusted so that a level of the tracking error signal in a track jump state becomes an intermediate level between a peak level and a bottom level is disclosed in Patent Literature 4.

Further, techniques of detecting a tilt of a recording medium on the basis of light intensity of an interference region between 0th-order light and 1st-order diffracted light are disclosed in Patent Literatures 5 and 6.

CITATION LIST

Patent Literature

Patent Literature 1: JP H8-249664A
Patent Literature 2: JP H5-242512A
Patent Literature 3: JP 2008-135151A
Patent Literature 4: JP 2005-85352A
Patent Literature 5: JP 2002-56556A
Patent Literature 6: JP 2006-99934A

DISCLOSURE OF INVENTION

Technical Problem

In the techniques disclosed in Patent Literatures 1 and 2, the crosstalk is attempted to be canceled by splitting the region, multiplying (weighting) some regions by a constant, and performing addition. However, an improvement in a signal characteristic in high linear density recording in which the shortest mark similar to that in the present disclosure exceeds a cutoff spatial frequency of an optical system, which is disclosed in the present disclosure, is not disclosed in either of the techniques. Further, an optimal configuration in a system using a partial response maximum likelihood (PRML) detection method, a change in a relation between a detrack and an RF signal characteristic in a case in which radial tilt occurs, and the like are not disclosed in either of the techniques.

In the recording/non-recording boundary portion, a large offset of the tracking error signal occurs particularly in a case in which there is defocus or a spherical aberration deviation.

Further, optical discs in which a method of recording data on both of a groove track and a land track (referred to appropriately as a "land/groove recording method") is employed to increase a recording capacity are known, but in the case of the land/groove recording method, since a change in reflectance by recording is larger than in a case in which data is recorded on either of the land and the groove, a larger offset is likely to occur. In addition, in a case in which a land/groove pitch is reduced in order to realize higher recording density, influence of the offset is further increased.

Furthermore, when there is radial tilt, and coma aberration occurs, a zero-cross point of the tracking error signal deviates from the center of the track, and a detrack occurs, but in the case of the method of performing recording on both the land and the groove, influence of the detrack according to the offset of the tracking error signal is further increased.

In the method disclosed in Patent Literature 4, a tracking error signal having a small offset so that there is no influence of a defocus or coma aberration is unable to be formed. The techniques disclosed in Patent Literatures 5 and 6 relate to the detection of the radial tilt, and a reduction of an offset caused by the radial tilt has not been considered.

In this regard, it is an object of the present disclosure to provide an optical disc device which is capable of reducing the crosstalk in high linear density recording in which the shortest mark exceeds a cutoff spatial frequency of an optical system, a land/groove recording method, and a configuration in which a pitch between a land and a groove is small, reducing an offset of a tracking error signal and/or a detrack even when there is defocus, a spherical aberration, and radial tilt, and thereby implementing the high density.

Solution to Problem

To solve the above-described problem, the present disclosure is an optical disc device that records and/or reproduces information on an optical medium in which a guide groove is formed on a signal recording layer, the optical medium being capable of recording information in both a land portion and a groove portion formed by the guide groove, the optical disc device including:

a light source;

an objective lens configured to condense a light beam radiated from the light source onto the signal recording layer formed on the optical medium;

an objective lens moving unit configured to move the objective lens in a tracking direction;

an optical splitting element configured to split a luminous flux of a light beam reflected by the optical medium into a plurality of regions;

a light detecting unit configured to receive each of light beams corresponding to the plurality of regions split by the optical splitting element and generate a light reception signal;

a control signal generating unit configured to generate a tracking error signal indicating a deviation amount between a condensing spot on the signal recording layer and the guide groove in the tracking direction on the basis of a signal from the light detecting unit; and a servo control unit configured to move the objective lens in the tracking direction via the objective lens moving unit on the basis of the tracking error signal generated by the control signal generating unit and cause the objective lens to move and track on a desired land portion or groove portion, in which a weighting of a second region among the plurality of regions is larger than a weighting of a first region, a weighting of a fourth region is larger than a weighting of a third region, and when a groove pitch of the guide groove is represented as Gp, a wavelength of the light beam radiated from the light source is represented as $\lambda$, and a numerical aperture of the objective lens is represented as NA, and a radial direction is represented as an x axis, and a tangential direction is represented as a y axis with a returning luminous flux serving as a unit circle having a radius of 1, and a center of a position on the returning luminous flux serving as an origin, the first region is a region including $$(x,y)=(\pm k/2, 0) \quad \text{[Math. 1]}$$

expressed using $k=\lambda/(NA \cdot Gp)$, in other words, the first region is a region including a center of a region in which 0th-order light and +1st-order light diffracted by the guide groove overlap, the second region is a region including one or both of $$(x,y)=(+k/2, +\sqrt{(8-3k^2)/12}) \quad \text{[Math. 2]}$$

and $$(x,y)=(+k/2, -\sqrt{(8-3k^2)/12}) \quad \text{[Math. 3]}$$

the third region is a region including $$(x,y)=(-k/2, 0) \quad \text{[Math. 4]}$$

in other words, the third region is a region including a center of a region in which the 0th-order light and −1st-order light diffracted by the guide groove overlap, and the fourth region is a region including one or both of $$(x,y)=(-k/2, +\sqrt{(8-3k^2)/12}) \quad \text{[Math. 5]}$$

and $$(x,y)=(-k/2, -\sqrt{(8-3k^2)/12}) \quad \text{[Math. 6]}$$

Advantageous Effects of Invention

According to at least one embodiment, since the tracking error signal is formed using a detection signal having favorable symmetry in a radial direction, it is possible to reduce the influence of the radial tilt. Furthermore, it is possible to reduce the offset of the tracking error signal through a lens shift detection signal. Note that effects are not necessarily limited to the effects described herein and may be any effect described in the present disclosure.

BRIEF DESCRIPTION OF DRAWINGS

FIG. 2 is a schematic diagram illustrating a configuration of an optical pickup in an embodiment of the present disclosure.

FIG. 13 is a schematic diagram used for describing a region splitting pattern.

FIG. 25 is a schematic diagram for describing a relation between radial tilt and a detrack.

MODE(S) FOR CARRYING OUT THE INVENTION

The embodiments described below are suitable specific examples of this invention, and includes technically preferred various limitations. However, the scope of this invention is not limited to these embodiments, unless limitations to this invention are particularly stated in the description below.

It is noted that the description below will be provided in the following order.
<1. Embodiment>
<2. Other embodiment>
<3. Modification example>

1. Embodiment

"Optical Disc Device"

Figure 1:
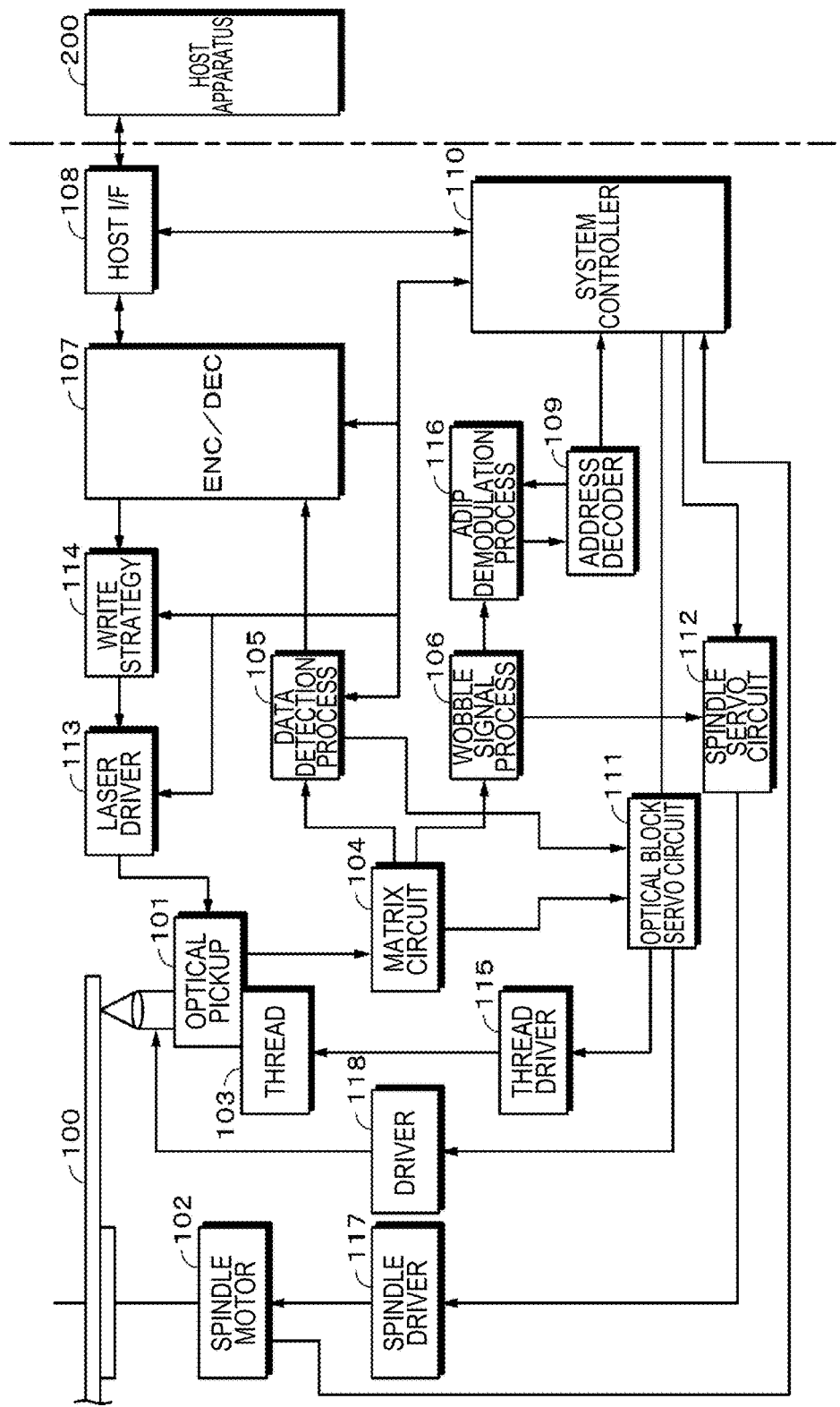
FIG. 1 is a block diagram illustrating a configuration of an optical disc device according to an embodiment of the present disclosure.

As shown in FIG. 1, this optical disc device includes an optical pickup 101 that performs recording and reproduction of information on an optical disc 100 serving as an optical recording medium, and a spindle motor 102 that rotates the optical disc 100. A thread (feeding motor) 103 is provided to move the optical pickup 101 in a diameter direction of the optical disc 100.

As the optical disc 100, a high-density optical disc such as a Blu-ray (registered trademark) Disc (BD) can be used. The BD is a high-density optical disc having a recording capacity of approximately 25 gigabytes with a single layer on one side and a recording capacity of approximately 50 gigabytes with a dual layer on one side. In a BD standard, in order to reduce a beam spot diameter, a wavelength of a light source is set to 405 nm and a numerical aperture (NA) of an objective lens is set to be large, i.e., 0.85. In a CD standard, the wavelength of the light source is 780 nm, NA is 0.45, and the spot diameter is 2.11 µm. In a DVD standard, the wavelength of the light source is 650 nm, NA is 0.6, and the spot diameter is 1.32 µm. In the BD standard, the spot diameter can be reduced to 0.58 µm.

In recent years, there has been implemented BDXL (registered trademark) in which a large capacity of 100 GB is achieved with a triple layer and 128 GB is achieved with a quad layer by reducing a channel bit length, i.e., a mark length and increasing a density in a linear-density direction in the BD (Blu-ray (registered trademark) Disc).

In addition, in order to further increase the recording capacity, it is desirable to use an optical disc in which a method for recording data on both a groove track and a land track (referred to as "land/groove recording method" as appropriate) is adopted. A grooved part is referred to as "groove" and a track formed of a groove is referred to as "groove track". The groove is defined as a part irradiated with laser light when an optical disc is produced. An area between adjacent grooves is referred to as "land", and a track formed of a land is referred to as "land track". In the case of a multilayer optical disc in which a plurality of information recording layers are stacked, the recording capacity can be larger.

In the land groove recording according to the related art, the crosstalk between the adjacent tracks is optically reduced by setting a wide track pitch in which (+/−) (+ or −)1st-order diffracted light by a groove overlaps and setting a groove depth to about λ/6 as in DVD-RAM. However, in order to implement a high capacity, a configuration in which a track pitch is narrow so that (+/−)1st-order diffracted light by a groove does not overlap, other layers are not adversely affected by a groove structure even in a multilayer optical disc structure as in the present disclosure, and it is possible to reduce the crosstalk between adjacent tracks even in a shallow groove structure equal to or less than that of a BD is preferable.

In the case where the high-density recordable optical disc 100 is mounted in the optical disc device, the optical disc is rotatably driven by the spindle motor 102 at the time of recording/reproduction at a constant linear velocity (CLU) or a constant angular velocity (CAV). In order to align phases of wobble grooves in a radial direction of the optical disc 100, a CAV or a zone CAV is preferable. At the time of reproduction, mark information recorded on a track of the optical disc 100 is read out by the optical pickup (optical head) 101. At the time of recording data on the optical disc 100, user data is recorded by the optical pickup 101 on the track of the optical disc 100 as a phase change mark or a pigment change mark.

In the case of a recordable disc, a recording mark using the phase change mark is recorded on a track formed of a wobbling groove, and the phase change mark is recorded with a linear density of 0.12 µm/bit and 0.08 µm/channel bit by an RLL (1, 7) PP modulation method (RLL; Run Length Limited, PP: Parity preserve/Prohibit rmtr (repeated minimum transition run-length)) or the like in the case of a BD having 23.3 GB per layer. Similarly, the phase change mark is recorded with a linear density corresponding to 0.0745 µm/channel bit in the case of a BD having 25 GB/layer, the phase change mark is recorded with a linear density corresponding to 0.05826 µm/channel bit in the case of BDXL (registered trademark) having 32 GB/layer, and the phase change mark is recorded with a linear density corresponding to 0.05587 µm/channel bit in the case of BDXL (registered trademark) having 33.4 GB/layer. Thus, the phase change mark is recorded with a density corresponding to the channel bit length in accordance with a type of a disc. Assuming that a channel clock cycle is "T", the mark length falls within a range of 2T to 8T. In the case of a reproduction-only disc, a groove has not been formed, but data modulated by the RLL (1, 7) PP modulation method has been similarly recorded as an embossed pit array.

As reproduction-only management information, for example, physical information of the disc is recorded by the embossed pit or the wobbling groove in an inner circumferential area or the like of the optical disc 100. Reading out of those kinds of information is also performed by the optical pickup 101. Further, reading out of ADIP information embedded as wobbling of the groove track of the optical disc 100 is also performed by the optical pickup 101.

A laser diode including a laser light source, an optical filter for separating reflected light into a plurality of signals having space-optically different bands in a linear-density direction and/or a track density direction, a photodetector for detecting a plurality of signals separated by the optical filter, an objective lens serving as a layer light output terminal, an optical system that irradiates the disc recording surface with laser light via the objective lens and guides the reflected light to the photodetector, and the like are disposed in the optical pickup 101. The objective lens is held in the optical pickup 101 to be movable in a tracking direction and a focus direction by a bi-axial mechanism. The entire optical pickup 101 is movable in the radial direction of the disc by the thread mechanism 103. A driving current is supplied to the laser diode of the optical pickup 101 from a laser driver 113, and the laser diode generates laser.

Reflected light from the optical disc 100 is detected by the photodetector and is supplied to a matrix circuit 104 as an electric signal corresponding to an amount of received light. The matrix circuit 104 includes a current/voltage conversion circuit, a matrix calculation/amplification circuit, and the like for output currents from a plurality of light-receiving elements serving as photodetectors and generates a necessary signal by performing a matrix calculation process. The current/voltage conversion circuit and a part of the matrix calculation/amplification circuit may be provided in the photodetector element in consideration of a signal transmission quality. For example, a reproduction information signal (RF signal) corresponding to reproduction data and a focus error signal and a tracking error signal for servo control are generated. Further, a signal related to wobbling of a groove, i.e., a push-pull signal is generated as a signal for detecting wobbling.

The reproduction information signal output from the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs a binarization process of the reproduction information signal. For example, the data detection processing unit 105 performs an A/D conversion process of the RF signal, a reproduction clock generation process using PLL, a partial response (PR) equalization process, Viterbi decoding (maximum likelihood decoding), and the like and obtains a binary data string by performing a partial response maximum likelihood decoding process (PRML detection method: partial response maximum likelihood detection method). The data detection processing unit 105 supplies the binary data string, which is information read out from the optical disc 100, to an encoding/decoding unit 107 at a latter stage.

The encoding/decoding unit 107 performs a demodulation process of reproduction data at the time of reproduction and performs a modulation process of record data at the time of recording. That is, the encoding/decoding unit 107 performs data demodulation, de-interleave, ECC decoding, address decoding, and the like at the time of reproduction and performs ECC encoding, interleave, data modulation, and the like at the time of recording.

At the time of reproduction, the binary data string decoded in the data detection processing unit 105 is supplied to the encoding/decoding unit 107. The encoding/decoding unit 107 performs a demodulation process on the binary data string and therefore obtains reproduction data from the optical disc 100. That is, for example, the encoding/decoding unit 107 performs a demodulation process and an ECC decoding process for correcting errors on data which has been subjected to run-length limited code modulation such as RLL (1, 7) PP modulation and has been recorded on the optical disc 100 and therefore obtains reproduction data from the optical disc 100.

Data decoded as the reproduction data in the encoding/decoding unit 107 is transmitted to a host interface 108 and is transmitted to a host apparatus 200 in response to an instruction of a system controller 110. The host apparatus 200 is, for example, a computer device or an audio-visual (AV) system apparatus.

When recording/reproduction is performed on the optical disc 100, processing of ADIP information is performed. That is, the push-pull signal that is output from the matrix circuit 104 as a signal related to wobbling of a groove is converted into digitalized wobble data in the wobble signal processing circuit 106. A clock synchronized with the push-pull signal is generated by a PLL process. The wobble data is demodulated to a data stream forming an ADIP address in an ADIP demodulation processing unit 116 and is supplied to an address decoder 109. The address decoder 109 decodes the supplied data to obtain an address value and supplies the address value to the system controller 110.

At the time of recording, record data is transmitted from the host apparatus 200, and the record data is supplied to the encoding/decoding unit 107 via the host interface 108. The encoding/decoding unit 107 performs, as an encoding process of record data, addition of an error correcting code (ECC encoding), interleave, addition of a subcode, and the like. The data subjected to those processes is subjected to run-length limited code modulation such as the RLL (1-7) PP method.

The record data processed in the encoding/decoding unit 107 is supplied to a write strategy unit 114. The write strategy unit 114 performs, as a recording compensation process, laser driving pulse waveform adjustment on characteristics of a recording layer, a spot shape of laser light, a recording linear velocity, and the like. Then, a laser driving pulse is output to the laser driver 113.

The laser driver 113 supplies a current to the laser diode in the optical pickup 101 on the basis of the laser driving pulse subjected to the recording compensation process and emits laser light. Thus, a mark corresponding to the record data is formed on the optical disc 100.

The optical block servo circuit 111 generates various servo drive signals such as focus, tracking, and thread drive signals in accordance with the focus error signal and the tracking error signal supplied from the matrix circuit 104 and performs servo operation. That is, the optical block servo circuit 111 generates a focus drive signal and a tracking drive signal in accordance with the focus error signal and the tracking error signal, and a driver 118 drives a focus coil and a tracking coil of the bi-axial mechanism in the optical pickup 101. Thus, a tracking servo loop and a focusing servo loop are formed by the optical pickup 101, the matrix circuit 104, the optical block servo circuit 111, the driver 118, and the bi-axial mechanism.

In response to a track jump instruction from the system controller 110, the optical block servo circuit 111 performs track jump operation by turning off the tracking servo loop and outputting a jump drive signal. Further, the optical block servo circuit 111 generates a thread drive signal on the basis of a thread error signal obtained as a low frequency component of the tracking error signal, access execution control of the system controller 110, and the like, and then a thread driver 115 drives the thread mechanism 103.

A spindle servo circuit 112 performs control for CLV-rotating or CAV-rotating the spindle motor 102. The spindle servo circuit 112 generates a spindle error signal by obtaining, as current rotation speed information of the spindle motor 102, the clock generated by PLL for a wobble signal and comparing the clock with predetermined reference speed information. At the time of reproduction of data, a reproduction clock generated by PLL in the data detection processing unit 105 is the current rotation speed information of the spindle motor 102, and therefore the spindle error signal is generated by comparing the rotation speed information with the predetermined reference speed information. Then, the spindle servo circuit 112 outputs a spindle drive signal generated in accordance with the spindle error signal, thereby causing a spindle driver 117 to perform CLV-rotation or CAV-rotation of the spindle motor 102.

The spindle servo circuit 112 generates the spindle drive signal in accordance with a spindle kick/brake control signal supplied from the system controller 110 and also performs operation such as start, stop, acceleration, and deceleration of the spindle motor 102.

Various kinds of operation in such a servo system and a recording/reproduction system are controlled by the system controller 110 including a microcomputer. The system controller 110 performs various processes in response to commands supplied from the host apparatus 200 via the host interface 108. For example, in the case where a write command is transmitted from the host apparatus 200, the system controller 110 moves the optical pickup 101 to an address where writing is to be performed. Then, the system controller 110 causes the encoding/decoding unit 107 to perform the encoding process on data (for example, video data or audio data) transmitted from the host apparatus 200 as described above. Then, the laser driver 113 drives emission of laser light in accordance with the encoded data. In this way, recording is performed.

For example, in the case where a read command for requesting transmission of certain data recorded on the optical disc 100 is supplied from the host apparatus 200, the system controller 110 controls seek operation for the specified address. That is, the system controller 110 transmits an instruction to the optical block servo circuit 111 and causes the optical pickup 101 to perform access operation by using the address specified by a seek command as a target. Thereafter, the system controller 110 performs operation control needed to transmit data in such a specified data section to the host apparatus 200. That is, the system controller 110 reads out data from the optical disc 100, causes the data detection processing unit 105 and the encoding/decoding unit 107 to perform reproduction processes, and transmits required data.

Although the optical disc device connected to the host apparatus 200 has been described in the example of FIG. 1, the optical disc device may or may not be connected to another apparatus. In that case, an operation unit and a display unit are provided, and a configuration of an interface part via which data is input/output differs from that in FIG. 1. That is, it is only necessary to perform recording and reproduction in accordance with user's operation and provide a terminal portion for inputting/outputting various kinds of data. As a matter of course, other various configuration examples of the optical disc device are conceivable.

"Optical Pickup"

The optical pickup 101 for use in the above optical disc device will be described with reference to FIG. 2. The optical pickup 101 records information on the optical disc 100 and reproduces the information from the optical disc 100 with the use of, for example, laser light (beam) having a wavelength λ of 405 nm. Laser light is emitted from a semiconductor laser (LD: laser diode) 1.

The optical disc 100 is irradiated with laser light that has passed through a collimator lens 2, a polarizing beam splitter (PBS) 3, and an objective lens 4. The polarizing beam splitter 3 has a separation surface that, for example, allows p-polarized light to be transmitted therethrough substantially 100% and reflects s-polarized light substantially 100%. Reflected light from a recording layer of the optical disc 100 returns through the same optical path and is incident on the polarizing beam splitter 3. By providing a λ/4 element (not shown) therebetween, the incident laser light is reflected by the polarizing beam splitter 3 substantially 100%.

The laser light reflected by the polarizing beam splitter 3 is split into a plurality of regions including signals having space-optically different bands in the linear-density direction and the track density direction through the splitting line extending in the radial direction (disc diameter direction) and/or the tangential direction (the track direction) of the optical disc 100 by the optical filter 7 and condensed on the light receiving surface of the photodetector 6 via the lens 5. The photodetector 6 includes a light receiving cell that performs photoelectric conversion on incident light on the light receiving surface. The light receiving cell is arranged to receive light split into a plurality of regions by the optical filter 7. The photodetector 6 outputs electric signals of a plurality of channels in accordance with an amount of received light of each region of the light receiving cell.

A splitting pattern JR4A of the optical filter illustrated in FIG. 2 is split spatially into four regions including signals having space-optically different bands in the linear-density direction and/or the track density direction, and the regions are further split in order to generate a tracking error signal suitable for an optical disc that performs finer pitch land groove recording. In other words, beams are split into outside regions C and D in the radial direction, a central region E, and regions A1 to A4 and B1 to B4 generated by further splitting outside regions in the tangential direction in the tangential direction and the radial direction. The light receiving cell may be arranged to receive the light split into a plurality of regions, or light of several regions among a plurality of regions may be received through the same light receiving cell.

Signals of four channels for RF signal detection may be generated by the matrix circuit 104 on the basis of a plurality of received signals and input to the data detection processing unit 105, and the tracking error signal may be generated and input to the optical block servo circuit 111. A+B (=A1+A2+A3+A4+B1+B2+B3+B4), C, D, and E are considered as an example of the signals Ch1 to Ch4 of the four channels of the optical filter JR4A.

The configuration of the optical pickup 101 of FIG. 2 includes minimum constituent elements for describing the present disclosure, and, for example, the focus error signal output to the optical block servo circuit 111 via the matrix circuit 104 and a signal for generating the push-pull signal output to the wobble signal processing circuit 106 via the matrix circuit 104 are not shown. In addition, various configurations other than the configuration shown in FIG. 2 are possible.

In the present disclosure, a cross-section of a luminous flux of a returning beam from the optical disc 100 is split into a plurality of regions, reproduction information signals of a plurality of channels corresponding to the respective regions are obtained, and a signal for tracking error signal detection is obtained. As a method of obtaining the reproduction information signal of each region, in addition to the method of splitting through the optical filter 7, a method of providing the photodetector with the function of the optical filter by splitting the photodetector 6 can also be used. When the splitting is performed by the optical filter 7, for example, a method of arranging an optical path conversion element for separating a plurality of regions in an optical path passing through the objective lens 4 and reaching the photodetector 6 and supplying a plurality of beams separated by the optical path conversion element to different photodetectors can be used, and a diffraction element such as a holographic optical element, a refractive element such as a micro lens array or a micro prism, or the like can be used as the optical path conversion element.

"Data Detection Processing Unit"

Figure 3:
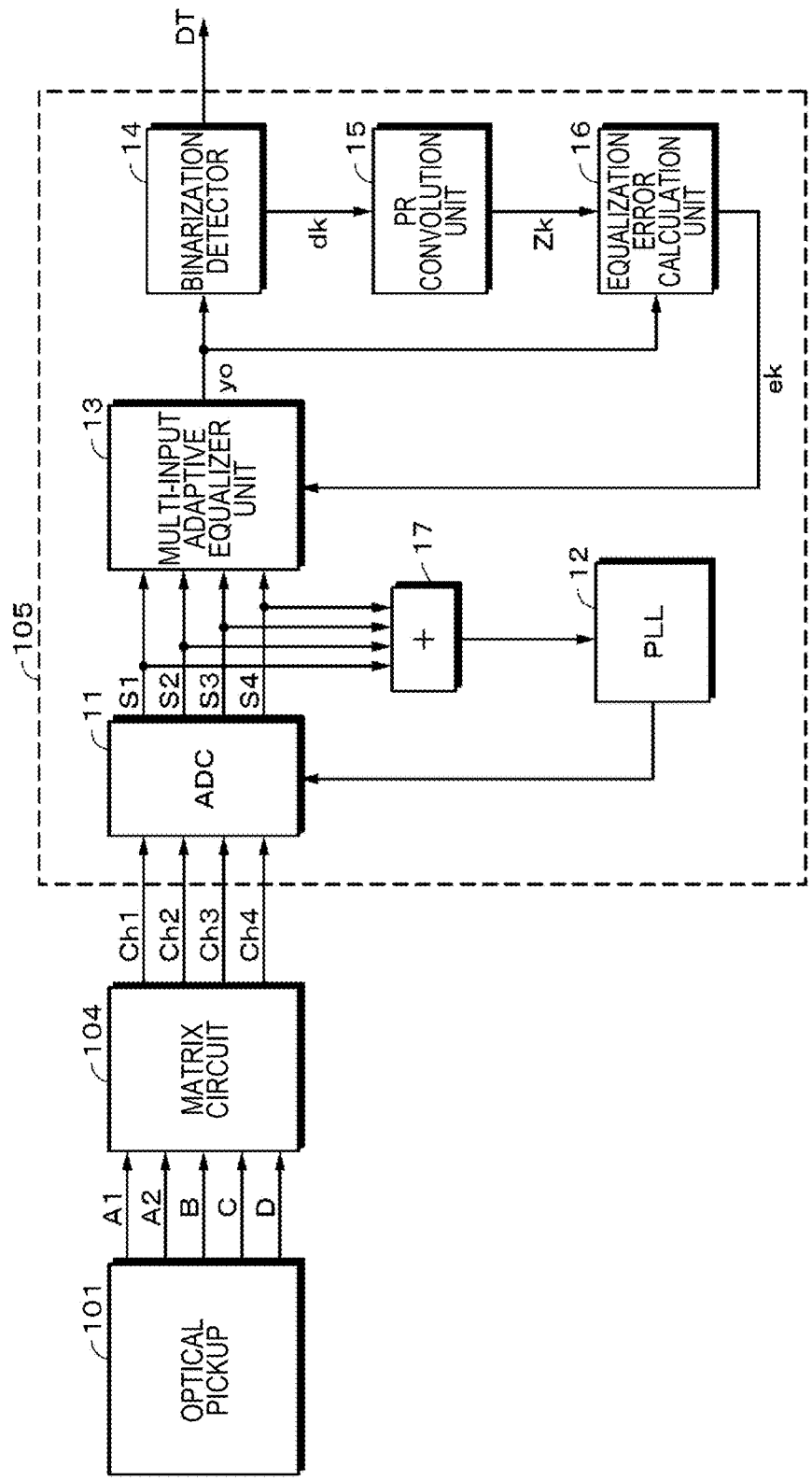
FIG. 3 is a block diagram of an example of a data detection processing unit in an embodiment.
Figure 4:
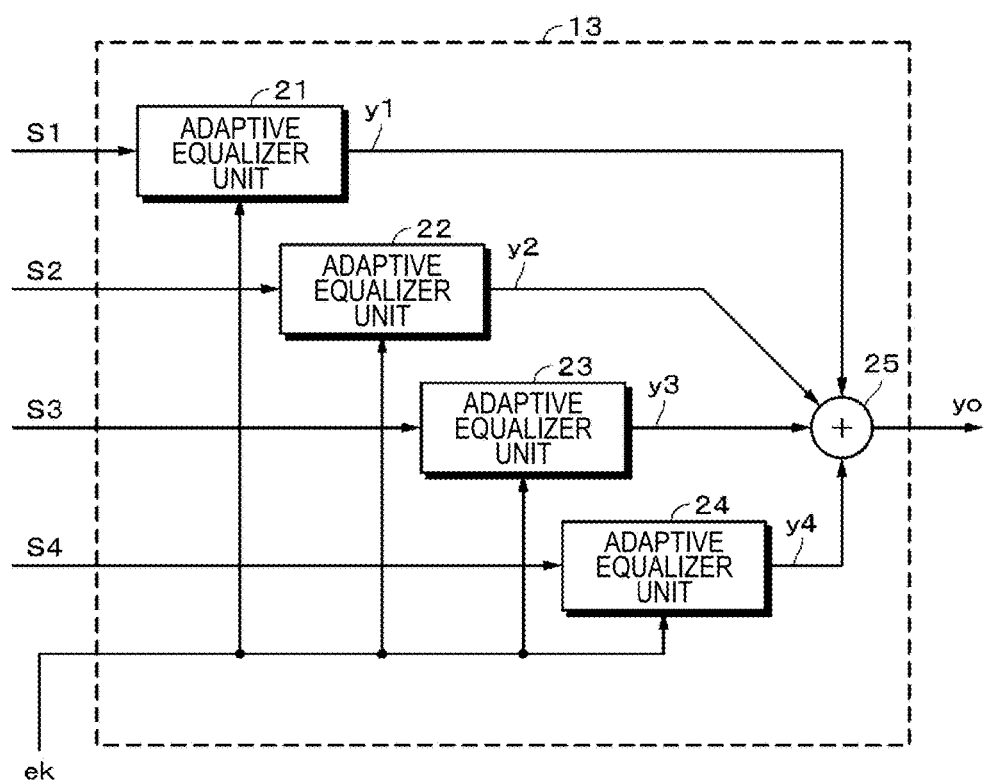
FIG. 4 is a block diagram of an example of a multi-input adaptive equalizer in the data detection processing unit.

As described above, detection signals, which are reproduced from the optical disc 100 by the optical pickup 101 and correspond to the regions, are supplied to the matrix circuit 104 and are converted into reproduction information signals of the plurality of channels corresponding to the regions. As shown in FIG. 3, the data detection processing unit 105 includes an A/D converter 11 to which reproduction information signals supplied from the matrix circuit 104 are supplied. FIG. 3 and FIG. 4 show an example where a cross-section of a luminous flux of a returning beam from the optical disc 100 is split into, for example, five regions and reproduction information signals Ch1 to Ch4 of four channels are obtained from the matrix circuit 104.

A clock for the A/D converter 11 is formed by the PLL 12. The reproduction information signal supplied from the matrix circuit 104 is converted into digital data through the A/D converter 11. Reproduction information signals obtained by digitalizing the reproduction information signals Ch1 to Ch4 of the four channels generated by the matrix circuit 104 are indicated by S1 to S4. A signal obtained by adding the reproduction information signals S1 to S4 by the adder circuit 17 is supplied to the PLL 12.

The data detection processing unit 105 further includes a multi-input adaptive equalizer unit 13, a binarization detector 14, a PR convolution unit 15, and an equalization error calculation unit 16. The multi-input adaptive equalizer unit 13 performs a PR adaptive equalization process based on the reproduction information signals S1 to S4. That is, the reproduction information signals S1 to S4 are output via the adaptive equalizer unit, and an added equalized signal y0 is equalized to approximate a target PR waveform.

As a signal to be input to the PLL 12, output of the multi-input adaptive equalizer unit may be used. In this case, an initial coefficient of the multi-input adaptive equalizer is set to a value determined in advance. Even in a case in which the signal supplied from the adder circuit 17 is used, instead of simply adding S1 to S4, frequency characteristics of the phases and the amplitudes of S1 to S4 may be changed by an FIR filter or the like and then added. In this case, a tap coefficient of the FIR filter may be set to a predetermined value.

The binarization detector 14 is, for example, a Viterbi decoder and performs a maximum likelihood decoding process on the equalized signal y0 that has been subjected to PR equalization, thereby obtaining binarized data DT. The binarized data DT is supplied to the encoding/decoding unit 107 shown in FIG. 1 and is subjected to a reproduction data demodulation process. In Viterbi decoding, a Viterbi detector configured by a plurality of states formed by using consecutive bits having a predetermined length as a unit and branches expressed by transitions therebetween is used and effectively detects a desired bit sequence among all possible bit sequences.

In an actual circuit, two registers, i.e., a register referred to as a path metric register and a register referred to as a path memory register are provided for each state. The path metric register stores a partial response sequence leading to the state and a path metric of a signal. The path memory register stores a flow of a bit sequence leading to the state. Further, a calculation unit referred to as a branch metric unit, which calculates a partial response sequence in the bit and a path metric of a signal, is provided for each branch.

The Viterbi decoder can associate various bit sequences in one-to-one correspondence by using one of paths passing a state. A path metric between a partial response sequence passing those paths and an actual signal (reproduction signal) is obtained by sequentially adding inter-state transitions forming the above paths, that is, by sequentially adding the above branch metrics in the branches.

A path achieving a smallest path metric can be selected by comparing magnitudes of path metrics that two branches or less reached in each state have and sequentially selecting a path having a smaller path metric. By transmitting this selection information to the path memory register, information expressing a path reaching each state with a bit sequence is stored. A value of the path memory register is sequentially updated and is finally converged to a bit sequence achieving a smallest path metric, and a result thereof is output.

The PR convolution unit 15 generates a target signal Zk by performing a convolution process of a binarization result as represented by the following expression. The target signal Zk is an ideal signal having no noise because the target signal Zk is obtained by convoluting a binarization detection result. For example, in the case of PR (1, 2, 2, 2, 1), a value P for each channel clock is (1, 2, 2, 2, 1). A constraint length thereof is 5. In the case of PR (1, 2, 3, 3, 3, 2, 1), the value P for each channel clock is (1, 2, 3, 3, 3, 2, 1). A constraint length thereof is 7.

Furthermore, in the case of PR (1, 2, 3, 4, 4, 4, 3, 2, 1), the value P of each channel clock is (1, 2, 3, 4, 4, 4, 3, 2, 1). The constraint length is 9. In a case in which the recording density is increased to the extent that the capacity of the objective lens exceeds 35 GB when the wavelength λ of the laser light is 405 nm, the NA of the objective lens is 0.85, and the track pitch is constant at 0.32 μm, it is difficult to detect unless the detection capability is increased by increasing the constraint length of the partial response from 5 to 7, and in a case in which the recording density is increased to the extent that the capacity exceeds about 45 GB, it is necessary to increase the detection capability by increasing the constraint length from 7 to 9. In the following Formula, d indicates binarized data.

$$Z_n = \sum_n P_m d_{n-m}$$

$P=(1,2,3,4,4,4,3,2,1)$ $P=(1,2,3,3,3,2,1)$ $P=(1,2,2,2,1)$ [Math. 7]

Figure 6:
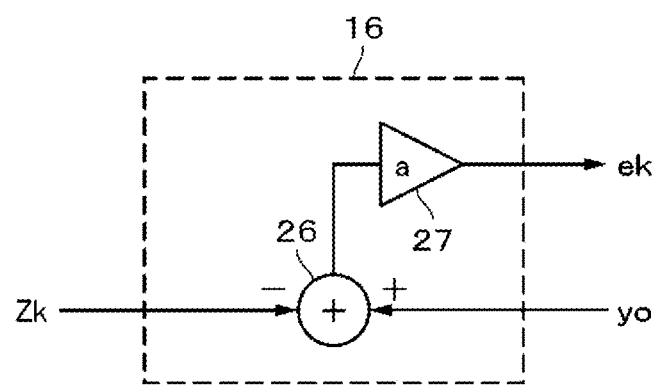
FIG. 6 is a block diagram of an example of an equalization error calculation unit.

The equalization error calculation unit 16 calculates an equalization error ek on the basis of the equalized signal y0 supplied from the multi-input adaptive equalizer unit 13 and the target signal Zk and supplies the equalization error ek to the multi-input adaptive equalizer unit 13 in order to perform tap coefficient control. As shown in FIG. 6, the equalization error calculation unit 16 includes a subtractor 26 and a coefficient multiplier 27. The subtractor 26 subtracts the target signal Zk from the equalized signal y0. The coefficient multiplier 27 multiplies a result of this subtraction by a predetermined coefficient a. As a result, the equalization error ek is generated.

As illustrated in FIG. 4, the multi-input adaptive equalizer unit 13 includes adaptive equalizer units 21, 22, 23, and 24 and an adder 25. The above reproduction information signals S1 to S4 are input to the adaptive equalizer units 21 to 24, respectively. A configuration of the multi-input adaptive equalizer unit 13 in which the reproduction information signals output from the matrix circuit are signals of 4 channels is illustrated. The adaptive equalizer units are provided in accordance with the number of channels of the input signals.

Each of the adaptive equalizer units 21, 22, 23, and 24 has parameters of the finite impulse response (FIR) filter the number of taps, calculation accuracy (bit resolution) thereof, and an update gain of adaptive calculation, and optimal values are set for each equalizer unit. The equalization error ek is supplied to each of the adaptive equalizer units 21, 22, 23, and 24 as a coefficient control value for adaptive control.

Outputs y1, y2, y3, and y4 of the adaptive equalizer units 21, 22, 23, and 24 are added in the adder 25 to be output as the equalized signal y0 of the multi-input adaptive equalizer unit 13. An output target of the multi-input adaptive equalizer unit 13 is an ideal PR waveform obtained by convoluting a binarization detection result in PR (partial response).

Figure 5:
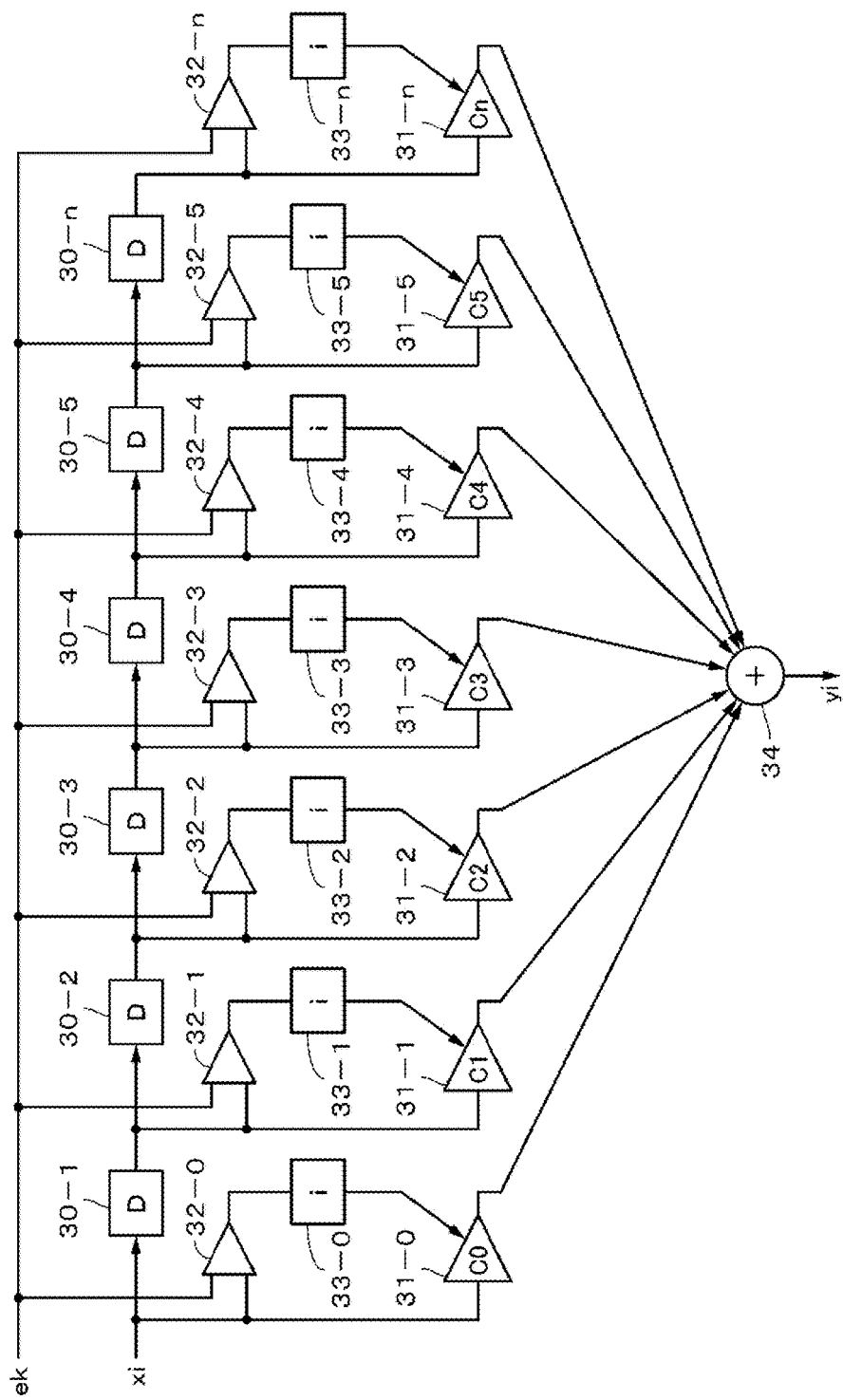
FIG. 5 is a block diagram of an example of an adaptive equalizer unit.

The adaptive equalizer unit 21 includes, for example, an FIR filter as shown in FIG. 5. The adaptive equalizer unit 21 is a filter having taps of n+1 stages including delay elements 30-1 to 30-$n$, coefficient multipliers 31-0 to 31-$n$, and an adder 34. The coefficient multipliers 31-0 to 31-$n$ multiply tap coefficients C0 to Cn by an input x at each point of time. Outputs of the coefficient multipliers 31-0 to 31-$n$ are added in the adder 34 and are extracted as an output y0. For the tap coefficient, an initial value is set in advance.

In order to perform an adaptive equalization process, the tap coefficients C0 to Cn are controlled. For this purpose, calculators 32-0 to 32-$n$, each of which receives the equalization error ek and each tap input and performs calculation, are provided. Further, integrators 33-0 to 33-$n$ that integrate outputs of the calculators 32-0 to 32-$n$ are provided. In each of the calculators 32-0 to 32-$n$, for example, $-1 \times ek \times x$ is calculated. Outputs of the calculators 32-0 to 32-$n$ are integrated in the integrators 33-0 to 33-$n$, respectively, and the tap coefficients C0 to Cn of the coefficient multipliers 31-0 to 31-$n$ are controlled to be changed on the basis of a result of this integration. The integrators 33-0 to 33-$n$ are integrated to adjust responsiveness of adaptive coefficient control.

In the data detection processing unit 105 having the above configuration, unnecessary signals such as crosstalk are reduced and binarized data is decoded.

The adaptive equalizer units 22, 23, and 24 have a configuration similar to that of the adaptive equalizer unit 21. The adaptive equalizer units 21, 22, 23, and 24 are supplied with the common equalization error ek and perform adaptive equalization. That is, the adaptive equalizer units 21, 22, 23, and 24 optimize errors of input signal frequency components and phase distortion of the reproduction information signals Sa, Sb, and Sc, i.e., perform adaptive PR equalization. That is, the tap coefficients C0 to Cn are adjusted on the basis of a result of calculation of $-1 \times ek \times x$ in the calculators 32-0 to 32-$n$. This means that the tap coefficients C0 to Cn are adjusted to correct the equalization error.

Thus, the adaptive equalizer units 21, 22, 23, and 24 perform adaptive control with the use of the equalization error ek so that the tap coefficients C0 to Cn have target frequency characteristics. The equalized signal y0 of the multi-input adaptive equalizer unit 13, which is obtained by adding the outputs y1, y2, y3, and y4 of the adaptive equalizer units 21, 22, 23, and 24 in the adder 25, is a signal having reduced crosstalk, inter-symbol interference and the like.

1. First Embodiments

"Electro-Optical Filter"

A signal reproduced from an optical disc is largely diverged from an ideal signal because increase in inter-symbol interference caused by increase in density in a linear direction and increase in leakage of a signal from an adjacent track caused by increase in density in a track direction occur in the ideal signal. This problem has been conventionally solved by an electrical filter. For example, 33.4 GB/L is achieved in BDXL (registered trademark).

Figure 7:
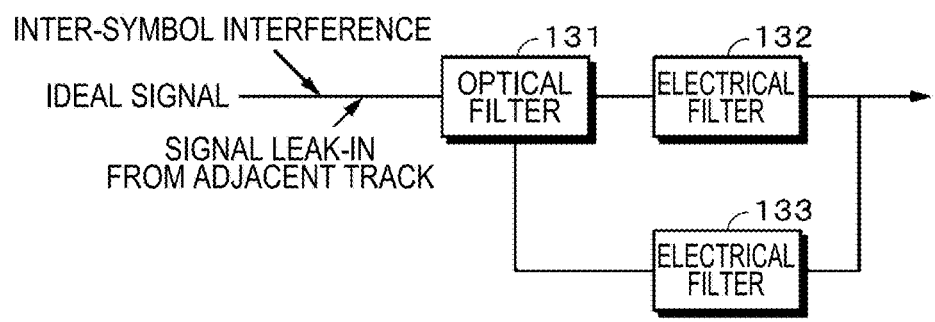
FIG. 7 is a block diagram of an example of a reproducing configuration.

FIG. 7 shows a configuration that reproduces a high-density recorded signal according to the present disclosure. That is, a reproduction signal is supplied to an optical filter 131 and is separated by the optical filter 131 into a plurality of signals having space-optically different bands in the linear-density direction and/or track-density direction. The plurality of separated signals, e.g., two signals are supplied to electrical filters 132 and 133 optimal for the respective signals and outputs of the electrical filters 132 and 133 are summed up, and thus an output signal is obtained.

In the present disclosure, the luminous flux of the light beam reflected by the optical disc 100 is received and split into a plurality of regions having space-optically different bands in the linear-density direction and/or the track density direction through the splitting line extending in the radial direction and the tangential direction by the optical filter 7. Detection signals of a plurality of channels are formed using a plurality of detection signals corresponding to the light amounts incident on a plurality of regions and supplied to the electrical filters. The adaptive equalizer unit corresponds to an electrical filter. The matrix circuit 104 undertakes some functions of the optical filter by receiving the signal light which has undergone the region splitting through different light receiving elements and then performing an operation.

This technology is referred to as an "adaptive electro optical (AERO) multifunction filter."

"Change in Most Favorable Track Position Due to Radial Tilt"

Next, generation of the tracking error signal which is a feature of the present disclosure will be described. In the present disclosure, the tracking error signal is formed through a configuration based on the push-pull method using one beam. The radial tilt should be considered when the tracking error signal is formed. If there is radial tilt, the most favorable track position changes as can be seen from simulation results in FIGS. 8 and 9.

The simulation conditions are as follows.

Tp=0.225 μm (each of land and groove), wavelength λ=405 nm, NA=0.85, PR (1233321)

Evaluation index: i-MLSE groove depth (1/16)λ

Mark width=Tp×0.7, and there are disc noise and amplifier noise

Signal recording density LD 35.18 GB (53 nm/channel bit) 50.0 GB/layer cover layer thickness 100 μm Tap 1T interval 31 tap splitting pattern is JR4A in FIG. 2

Figure 8:
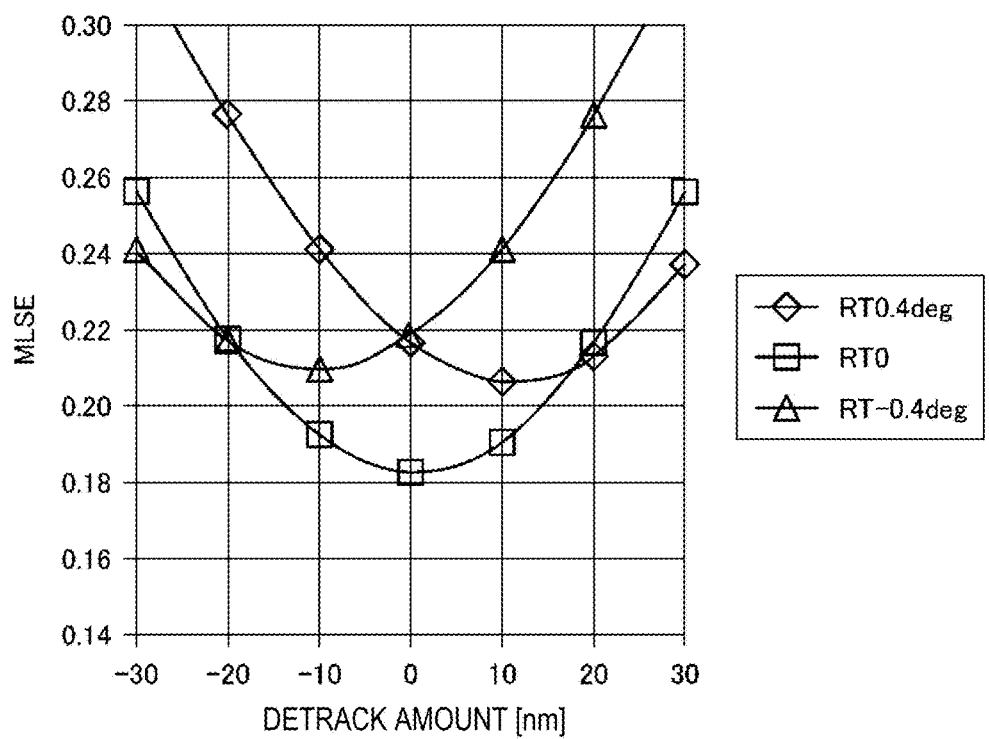
FIG. 8 is a graph used for describing a most favorable track position at the time of radial tilt in a case in which region splitting is not performed.
Figure 9:
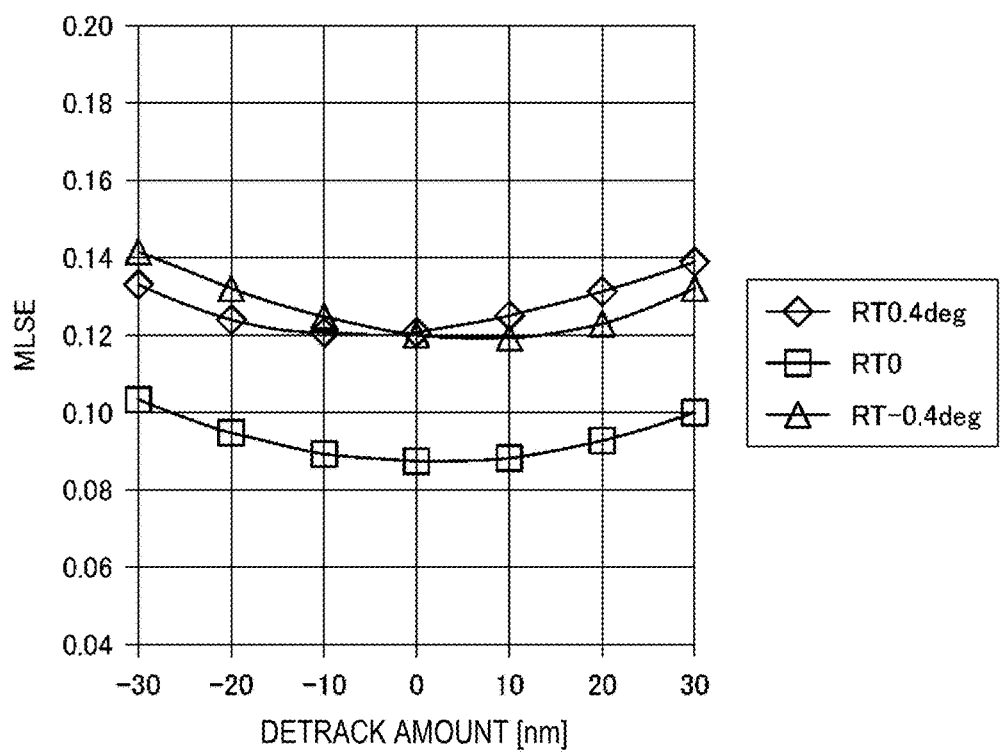
FIG. 9 is a graph used for describing a most favorable track position at the time of radial tilt in a case in which region splitting is performed.

In FIG. 8 and FIG. 9, a horizontal axis indicates a detrack amount (nm), and a vertical axis indicates an evaluation index value i-MLSE. Other evaluation indexes e-MLSE may be used instead of i-MLSE. In a case in which the recording density is higher than BDXL (registered trademark), a data pattern in which an error easily occurs varies. As a result, the error of i-MLSE which is the evaluation index value according to the related art becomes a problem. In this regard, a signal evaluation value different from i-MLSE, which is necessary to improve the accuracy of the evaluation index value at a higher linear density and has a newly added data pattern, may be used for describing the effects. The new evaluation index value with the improved accuracy is referred to as "e-MLSE."

The following three data patterns are added in the e-MLSE.

A bit written as 1 in a pattern string indicates an error pattern, which is a part where bit inversion occurs, as contrasted with a detected pattern.

Additional pattern (1): 10111101
Additional pattern (2): 1011110111101
Additional pattern (3): 10111100111101

With a linear density equivalent to that of a conventional BDXL (registered trademark) for which accuracy of the i-MLSE is sufficient, the e-MLSE and the i-MLSE are substantially the same. With a higher linear density, a difference caused by improvement in accuracy appears. Both the e-MLSE and the i-MLSE have the same theoretical correlation between index value and error rate which is important in practical use. Therefore, although both the e-MLSE and the i-MLSE are different in calculation and a range of an applicable linear density, evaluation values of signal quality indicated by both the e-MLSE and the i-MLSE may be similarly comprehended.

FIG. 8 illustrates a relation between the radial tilt amount RT and the most favorable track position when the region splitting is not performed. The most favorable track position is a track position at which MLSE is smallest. The most favorable track position is different in a case in which the radial tilt amount is 0, in a case in which the radial tilt amount RT is 0.4 deg, and in a case in which RT is −0.4 deg. If the case in which the radial tilt amount RT is 0 is used as a reference, a polarity of the most favorable track position is inverted in accordance with whether the radial tilt amount is positive or negative.

FIG. 9 illustrates the relation between radial tilt amount RT and most favorable track position in a case in which the region splitting is performed, and the reproduction is performed using the AERO technique described above. The signal index value MLSE is improved as a whole. However, similarly to the case in which the region splitting is not performed, if the case in which the radial tilt amount RT is 0 is used as a reference, the polarity of the most favorable track position is inverted in accordance with whether the radial tilt amount is positive or negative. Furthermore, the most favorable track position in the case in which the region splitting is not performed is different from the most favorable track position in which the region splitting is performed. Particularly, the most favorable track position changes inversely according to whether the radial tilt amount is positive or negative.

"Mechanism in which Detrack Occurs Due to Radial Tilt"

Figure 10:
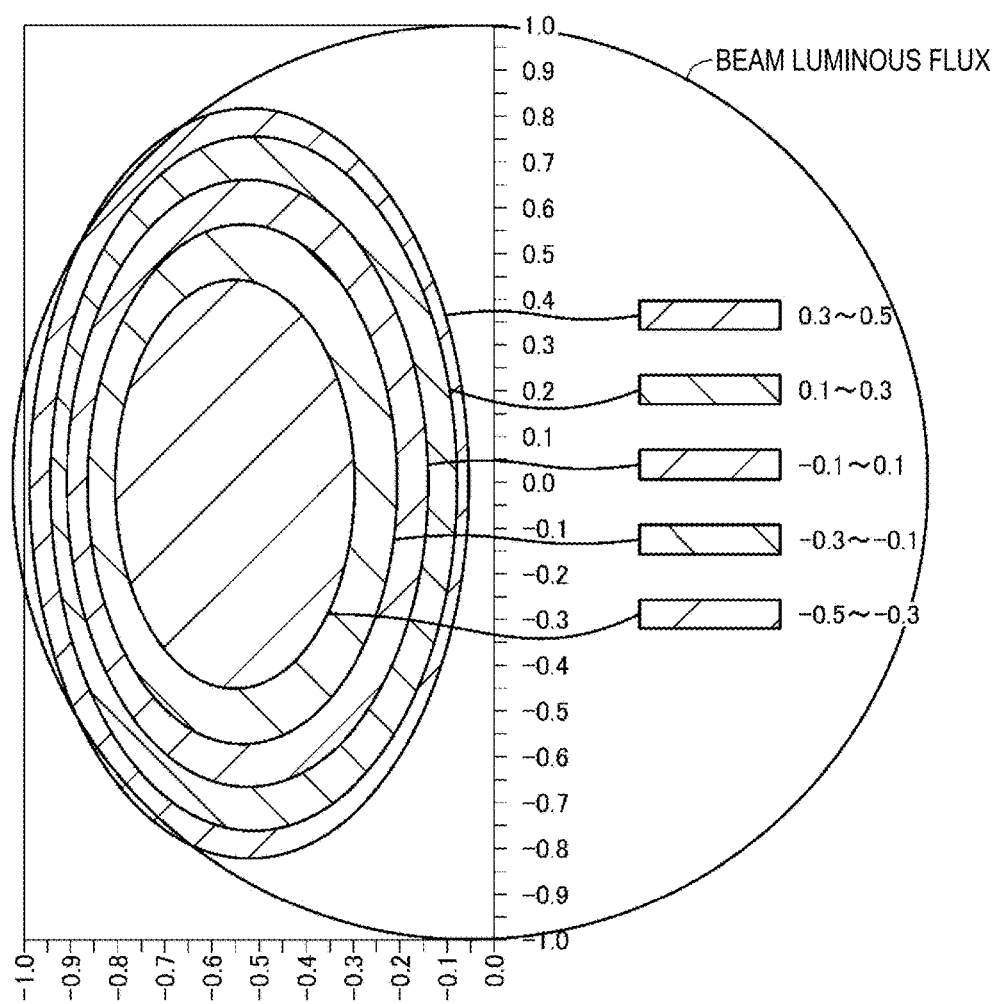
FIG. 10 is a graph illustrating a light amount distribution.

FIG. 10 illustrates a distribution of $(S1-S2)/(S1+S2)$ (normalized) when the radial direction on a pupil surface of returning light from a disc is indicated by an x axis, a tangential direction is indicated by a y axis, and light amounts per small area at positions symmetrical with respect to the y axis is indicated by S1 and S2 in a case in which a groove pitch in a land groove structure is 0.45 μm, a groove depth is (1/16) λ, a thickness of a cover layer to the recording layer is 100 μm, the radial tilt is 0.6 deg, the NA is 0.85, and the wavelength is 405 nm (0.405 μm). This means that the symmetry increases as this value decreases. In FIG. 10, a region having a value in a range (−0.1 to 0.1) is a region having the highest symmetry.

It is understood that even in a case in which an asymmetrical intensity distribution occurs in the radial direction due to the radial tilt, strengths at the symmetrical positions with respect to the y axis are symmetrical, that is, positions which are not influenced by the radial tilt, that is, the value in the range of (−0.1 to 0.1), exist in an elliptical shape in a region in which 0th-order diffracted light and 1st-order light caused by the groove overlap.

Figure 11:
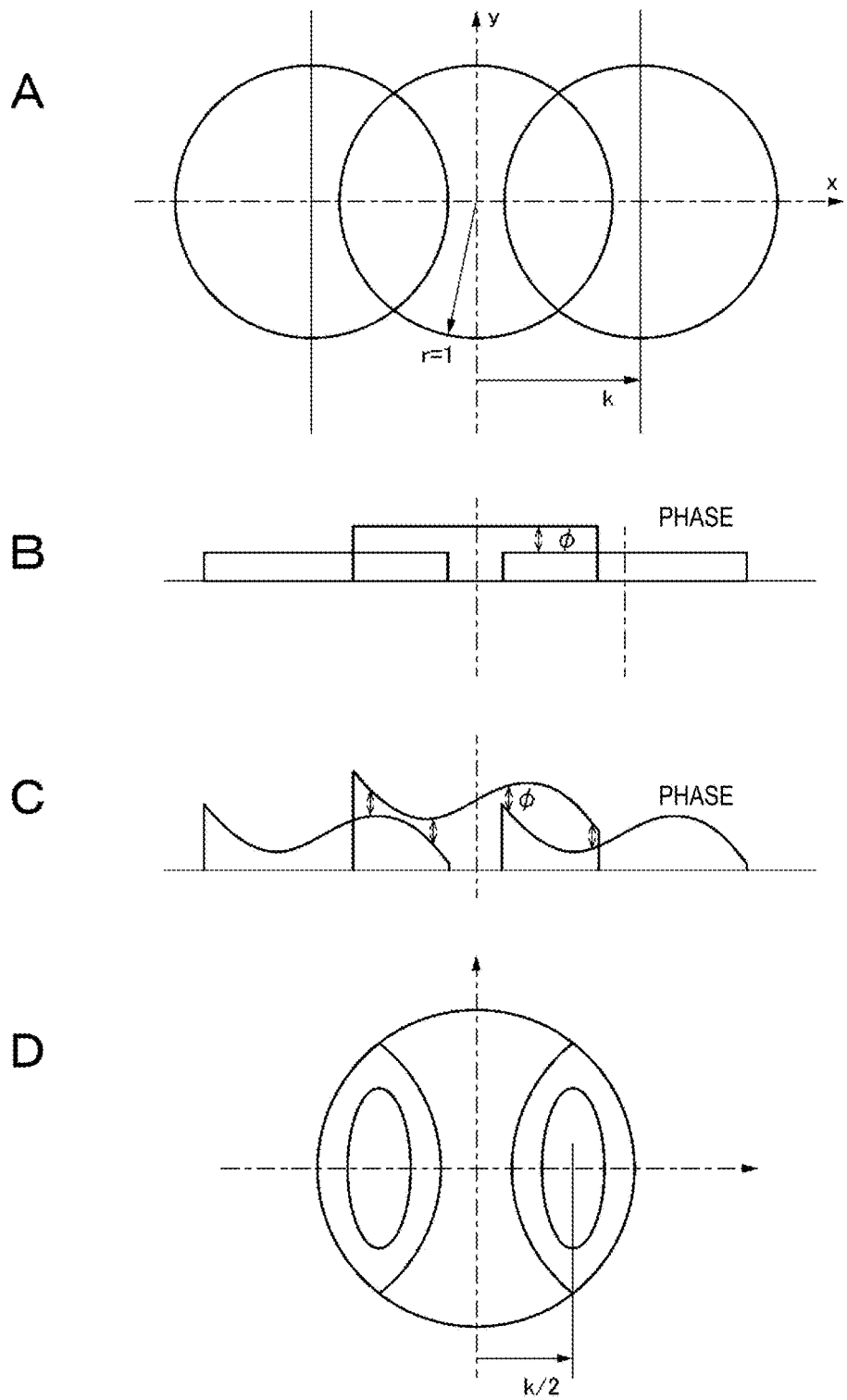
FIG. 11 is a schematic diagram for describing a region not affected by radial tilt.

How the region not affected by the radial tilt has the elliptical shape and relations between the position of the ellipse and the groove pitch, the NA, and the wavelength will be described with reference to FIG. 11. FIG. 11A illustrates a state in which the (+/−)1st-order diffracted light caused by the groove overlaps the 0th-order diffracted light when the 1st-order diffracted light caused by the groove on the disc is indicated by a circle having a radius of 1 centering on the origin. The (+/−)1st-order diffracted light is shifted by (+/−)k in the radial direction, that is, the x axis direction. Here, k is expressed as $k=\lambda/(NA \cdot Gp)$ using the groove pitch Gp (μm), the NA, and the wavelength (μm).

In a case in which the detrack amount is changed, the strength of the region in which the 0th-order light and the (+/−)1st-order light overlap changes because the change in which a phase difference between the 0th-order light and the +1st-order light and a phase difference between the 0th-order light and the −1st-order light are different is performed. When there is no aberration, and the detrack amount is 0, the phase difference between the 0th-order light and the +1st-order light and the phase difference between the 0th-order light and the −1st-order light are the same as illustrated in FIG. 11B.

On the other hand, in a state in which the radial tilt occurs and coma aberration occurs in the radial direction, the phase difference between the 0th-order light and the +1st-order light and the phase difference between the 0th-order light and −1st-order light have distributions which are different by a wave front caused by coma aberration as illustrated in FIG. 11C. However, even in this case, there is a position at which the phase difference between the 0th-order light and the +1st-order light and the phase difference between the 0th-order light and the −1st-order light are the same as in the case in which there is no aberration, and the strength does not change at the position.

The fact that the position in which the strength does not change due to the radial tilt becomes an elliptical shape will be described using mathematical formulas. The coma aberration is indicated as in the following formulas.

$$\text{Coma}=W_{31} \cdot (3\rho^2-2)\rho \cos \theta \qquad \text{[Math. 8]}$$

$$\rho^2 = x^2 + y^2 \qquad \text{[Math. 9]}$$

$$\rho \cos \theta = x \qquad \text{[Math. 10]}$$

Therefore, a condition in which the phase difference in the region in which the 0th-order light and the −1st-order light overlap is not changed by the coma aberration is indicated as in the following formula.

$$(3((x+k)^2+y^2)-2)(x+k)-(3(x^2+y^2)-2)x=0 \qquad \text{[Math. 11]}$$

If this formula is modified, the following formula is obtained. It is understood that it is an ellipse centering on (x, y)=(−k/2, 0). The same applies to the region in which the 0th-order light and the +1st-order light overlap.

$$\frac{y^2}{(8-3k^2)/12} + \frac{(x+k/2)^2}{(8-3k^2)/36} = 1$$

Coordinates of an end of the major axis of the ellipse are indicated as in the following formula.

$$(x,y)=(\pm k/2, \pm \sqrt{(8-3k^2)/12}) \qquad \text{[Math. 13]}$$

If the value of the coordinates is obtained under the condition of FIG. 10, $$(x\ y)=(+/-0.53,+/-0.62)$$

is obtained from $k=\lambda/(NA \cdot Gp)=1.06$ using the groove pitch Gp=0.45 μm, the NA=0.85, and the wavelength=0.405 μm, and it coincides with the result of FIG. 10.

In a case in which an operation based on the push-pull method is performed, it is possible to suppress the detrack when the radial tilt occurs if the region on the circumference of the ellipse is used as the tracking error signal. Specifically, in FIG. 12, it is desirable to use it so that weightings of the regions PP(s), PP(t), PP(u), and PP(y) are increased, and it is desirable to reduce the weight of the region PP(w). Particularly, since signals are stably obtained in the regions PP(s) and PP(t), that is, the regions including the following formula, even in a case in which the objective lens is scrolled, it is important to effectively increase the weightings of the regions PP(s) and PP(t) in suppressing the detrack when the radial tilt occurs.

$$(x,y)=(\pm k/2, \pm \sqrt{(8-3k^2)/12}) \qquad \text{[Math. 14]}$$

"Forming of Push-Pull Signal (Tracking Error Signal)"

First, an example in which the RF signal and the tracking error signal are obtained using the splitting pattern of FIG. 2 will be described. As described above, the circle in FIG. 2 indicates the outer circumference of the cross-section of the beam luminous flux. For example, a square indicates an area of an optical path conversion element including a diffraction element such as a holographic optical element for separating a plurality of regions, a refractive element such as a micro lens array or a micro prism, and the like, that is, an optical filter or an area of the light receiving cell of the photodetector for detection. For example, a relation in which one side of the square is equal to the diameter of the beam luminous flux is held.

An example in which there are five light receiving cells corresponding to the RF signal and the tracking error signal detection on the photodetector 6 will be described. The light receiving cells are arranged in the order of PD(C), PD(B), PD(E), PD(A), and PD(D) in the radial direction, and PD(C), PD(D), and PD(E) receive signal light corresponding to the regions C, D, and E. PD(A) receives the signal light corresponding to the regions A1 to A4, and PD(B) receives the signal light corresponding to the regions B1 to B4.

A tracking error signal Trk of a one-beam differential push-pull method according to the present disclosure is obtained by the following operation:

$$Trk=(PP1-PP2)-Kt \times (LS1-LS2) \qquad (1)$$

Items in Formula (1) are as follows. A reference numeral for a region is identical to a reference numeral for a detection signal obtained from the region.

$$PP1=C+0.5 \times E \qquad (2)$$

$$PP2=D+0.5 \times E \qquad (3)$$

$$LS1=A \qquad (4)$$

$$LS2=B \qquad (5)$$

Further, in order to obtain a stable tracking servo characteristic which has undergone the change of the light amount of the reflected light and the intensity distribution of a non-recorded portion, a land-only recorded portion, a groove-only recorded portion, a land groove recorded portion and a recording/reproducing operation, the following Formula (6) or Formula (7) can be used as AGC_SUM used as a denominator of an automatic gain control (AGC) of the tracking error signal.

$$AGC\_SUM1=PP1+PP2+LS1+LS2 \qquad (6)$$

$$AGC\_SUM2=LS1+LS2 \qquad (7)$$

As the signals of the four channels used for the RF signal reproduction according to the AERO technology, the following signals can be used.

$$Ch1=C$$

$$Ch2=D$$

$$Ch3=E$$

$$Ch4=A+B$$

Figure 12:
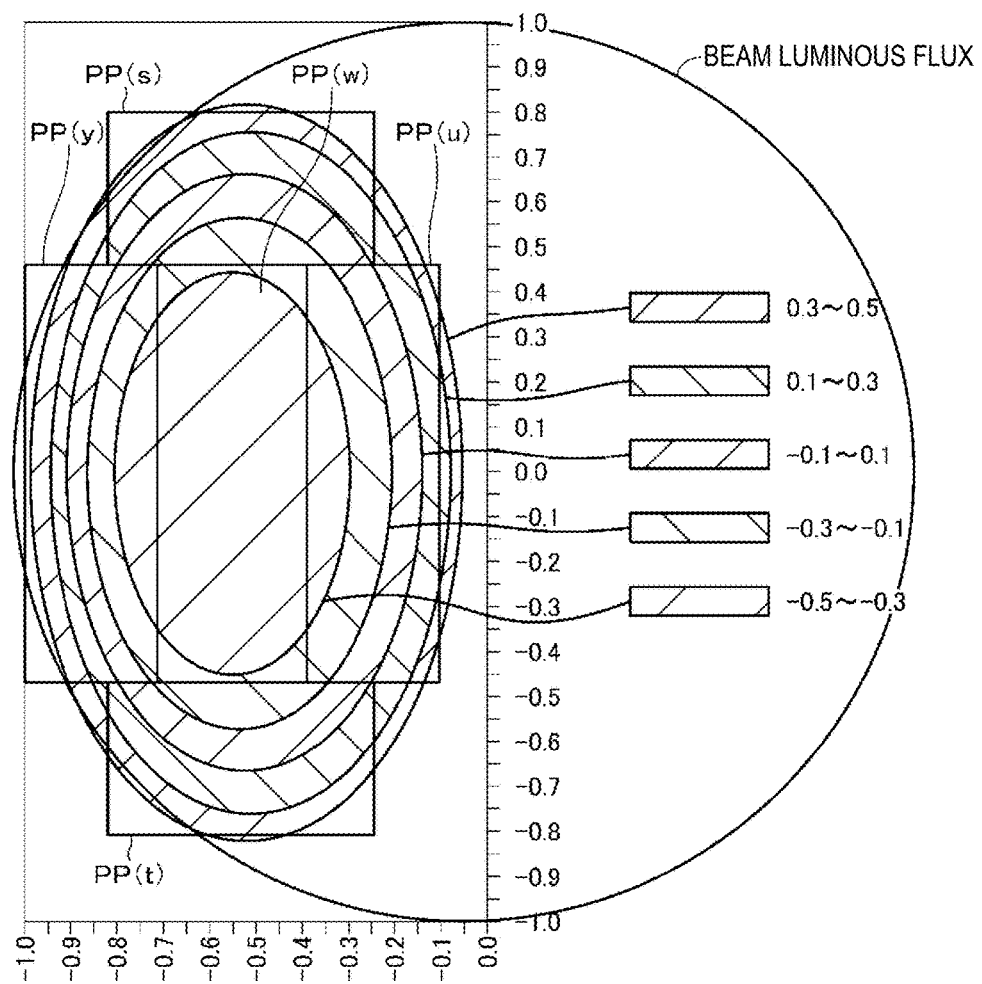
FIG. 12 is a graph illustrating a light amount distribution.

In the above configuration, the region PP(y) of FIG. 12 is mainly used in PP1−PP2, and the region PP(s), PP(t) in FIG. 12 is mainly used in LS1−LS2. It is a splitting pattern in which the balance of the RF signal characteristic and the tracking error signal characteristic according to the AERO technique is considered. In this splitting pattern, the offset of the PP1−PP2 signals caused by the scrolling of the objective lens is relatively large, and Kt is about 4 to 6. Accordingly, it is possible to effectively increase the weighting for the signals corresponding to the region PP(s) and PP(t) in FIG. 12, and even though the radial tilt occurs, it is possible to suppress the detrack to have a small value. Further, the central region PP(w) which is easily influenced by the strength change in the recording/non-recording boundary portion is not used for the tracking error signal, and the influence of the strength change in the recording/non-recording boundary portion between the regions A1 to A4 and B1 to B4 is effectively canceled in the portion of LS1−LS2, and thus it is possible to suppress the tracking error signal offset in the recording/non-recording boundary portion.

2. Other Embodiments

FIG. 13A is a splitting pattern IVSP 4 used for forming the RF signal and the push-pull signal according to the AERO technique. FIG. 13B is another splitting pattern used for effectively extracting the push-pull signal which is less affected by the lens shift detection and the radial tilt. Similarly to FIG. 13A, a circle in the drawing indicates the outer circumference of the cross section of the beam luminous flux. For example, a square indicates an area of an optical path conversion element including a diffraction element such as a holographic optical element for separating a plurality of regions, a refractive element such as a micro lens array or a micro prism, and the like, that is, an optical filter or an area of the light receiving cell of the photodetector for detection. For example, a relation in which one side of the square is equal to the diameter of the beam luminous flux is held.

The RF splitting pattern (FIG. 13A) for detecting the RF signal and the push-pull signal and the splitting pattern for the lens shift detection (FIG. 13B) are bifurcated into two optical paths through an optical path bifurcating unit (not illustrated), and thereafter, the returning luminous flux incident on each optical path is split independently and detected by a separate detection element.

As illustrated in FIG. 13B, lens shift detection regions extending in the radial direction in the form of a stripe are formed near both end portions in the tangential direction. Each lens shift detection region is split into two through a splitting line extending in the radial direction and split into two through a splitting line extending in the tangential direction, and thus four strip-like regions LS1$a$, LS2$a$, LS1$b$, and LS2$b$ are partitioned. The splitting line extending in the radial direction is positioned closer to the center of the luminous flux than the center position of the lens shift detection region.

For example, if distances to the upper and lower sides are 100% with respect to the center of the square region, in a case in which the groove pitch Tp=0.45 μm, NA=0.85, and wavelength=0.405 μm as described above, potions of the lower sides of the regions LS1$b$ and LS2$b$ are set to 60%, and positions of the lower sides of the regions LS1$a$ and LS2$a$ are set to 70%. Similar positions are set for the regions LS1$a$, LS2$a$, LS1$b$, and LS2$b$ on the lower side. Furthermore, the regions LS1$a$ and LS2$a$ are delimited at the center position in the radial direction, and the regions LS1$b$ and LS2$b$ are delimited at the center position in the radial direction.

$$(x,y)=(\pm k/2, \pm\sqrt{8-3k^2)/12})$$ [Math. 15]

The regions corresponding to the regions PP(s) and PP(t) of FIG. 12 including the above Formula, that is, (x, y)= ((+/−)0.53, (+/−)0.62) are effectively included in the regions LS1$b$ and LS2$b$. If it is further complemented, together with the configuration of FIG. 2 and the configuration of FIG. 13, the center position of the region in which the weighting is increased is the outside in the tangential direction further than the above Formula, that is, (x, y)=((+/−)0.53, (+/−) 0.62).

$$(x,y)=(\pm k/2, \pm\sqrt{(8-3k^2)/12})$$ [Math. 16]

In other words, it is the outside in the tangential direction further than (x, y)=((+/−)0.53, (+/−)0.62). Accordingly, the influence of radial tilt can be included in a component of an opposite phase with respect to the region of PP(w), and it is possible to further reduce the influence of the radial tilt on the entire tracking error signal.

The regions LS1$a$ to LS2$b$ include the regions LS1$a$ and LS2$a$ in which the modulation component of the push-pull signal is small, and the lens shift amount can be effectively detected and the regions LS1$b$ and LS2$b$ in which are hardly changed by the amount of the radial tilt. A region in which the modulation component of the push-pull signal is generated is an interference region in which the 0th-order light and (+/−)1st-order diffracted light overlap. The change in the light intensity according to the amount of the radial tilt is large in the interference region, particularly, the region near the center of the interference region. Therefore, if the regions LS1$a$ to LS2$b$ are set as illustrated in FIG. 13B, it is possible to effectively obtain the push-pull modulation component in which the influence of the radial tilt is small and the component corresponding to the lens shift.

In this configuration, the tracking error signal Trk of the one-beam differential push-pull method according to the present disclosure is obtained by the following operation.

$$Trk=(PP1-PP2)-Kt\times(LS1-LS2) \qquad (8)$$

Items in Formula (8) are as follows. A reference numeral for a region is identical to a reference numeral for a detection signal obtained from the region.

$$PP1=Klg1\times C2+Klg2\times C1+0.5\times(A+B)+0.5\times(1-Klg1)\times \\ (C2+D2)+0.5\times(1-Klg)\times(C1+D1) \qquad (9)$$

$$PP2=Klg1\times D2+Klg2\times D1+0.5\times(A+B)+0.5\times(1-Klg1)\times \\ (C2+D2)+0.5\times(1-Klg)\times(C1+D1) \qquad (10)$$

$$LS1=LS1a+Kls\times LS2b \qquad (11)$$

$$LS2=LS2a+Kls\times LS1b \qquad (12)$$

By optimizing the coefficients Klg1 and Klg2 in the PP1 and PP2 signals, it is possible to balance the weighting of the region corresponding to the region PP(y) and the weighting of the region corresponding to the region PP(w) in FIG. 12 so that the "detrack caused by the radial tilt" and "the offset of the tracking error signal in the recording/non-recording boundary portion" can be effectively reduced. An additional term canceled by PP1−PP2 is intended to cause PP1+PP2 to be the total light amount, and thus it is not essential. Klg1 and Klg2 may be variable or may be selected from a plurality of preset values or may be fixed to a pre-selected optimum value.

Further, the push-pull components LS1$b$ and LS2$b$ which are hardly affected by the radial tilt and the lens shift components LS1$a$ and LS2$a$ including little push-pull component are added to cancel the detected lens shift component. As a result, it is possible to correct the lens shift with a high degree of accuracy, and it is possible to reduce the fluctuation of the most favorable track position depending on the amount of the radial tilt. Further, since PP1−PP2 and LS1−LS2 are the same in the direction in which the signal offset changes when the objective lens is scrolled and opposite in the polarity of the push-pull component, the detection signals of the regions LS1$a$ to LS2$b$ are added to the push-pull signal through the tracking error signal operation, and thus the amplitude of the push-pull signal can be increased. Kls may be variable, may be selected from a plurality of preset values, or may be fixed to a pre-selected optimum value. Even with Kls, it is possible to balance so that the "detrack caused by the radial tilt" and the "offset of the tracking error signal in the recording/non-recording boundary portion" can be effectively reduced.

The general characteristics in the case of Klg1, Klg2, and Kls≥0 have been described above, but it is preferable to perform a setting the "detrack caused by the radial tilt" and the "offset of the tracking error signal in the recording/non-recording boundary portion" are reduced in a balanced manner in accordance with a combination of the wavelength, the NA, and the groove pitch and the region splitting pattern.

In the land/groove recording method, when the coefficients Klg1 and Klg2 in the formulas (9) and (10) have a relation of Klg1≥Klg2, the "detrack caused by the radial tilt" and the "offset of the tracking error signal in the recording/non-recording boundary portion" are easily reduced, but since Kt is relatively large, it tends to be affected by a Kt variation of each layer in the multilayer disc, an in-plane groove shape, unevenness of a recording film, and the like. Further, when the coefficient Kls in Formula (11) and Formula (12) is set to be positive, the "detrack caused by the radial tilt" and the "offset of the tracking error signal in the recording/non-recording boundary portion" can be effectively reduced, but if it is too large, the lens shift component according to LS1−LS2 becomes too small, and thus it is desirable to set Kls≤1. The coefficient Kt in Formula (1) is set to be larger than 1. The coefficients Klg1, Klg2, and Kls can also be switched (mode-switched) to coefficients corresponding to the type of optical disc. The recording/non-recording boundary problem is made to respond to the optimization of the coefficients Klg1, Klg2, and Kls.

"Improvement of Offset Caused by Non-Recorded/Recorded"

Figure 14:
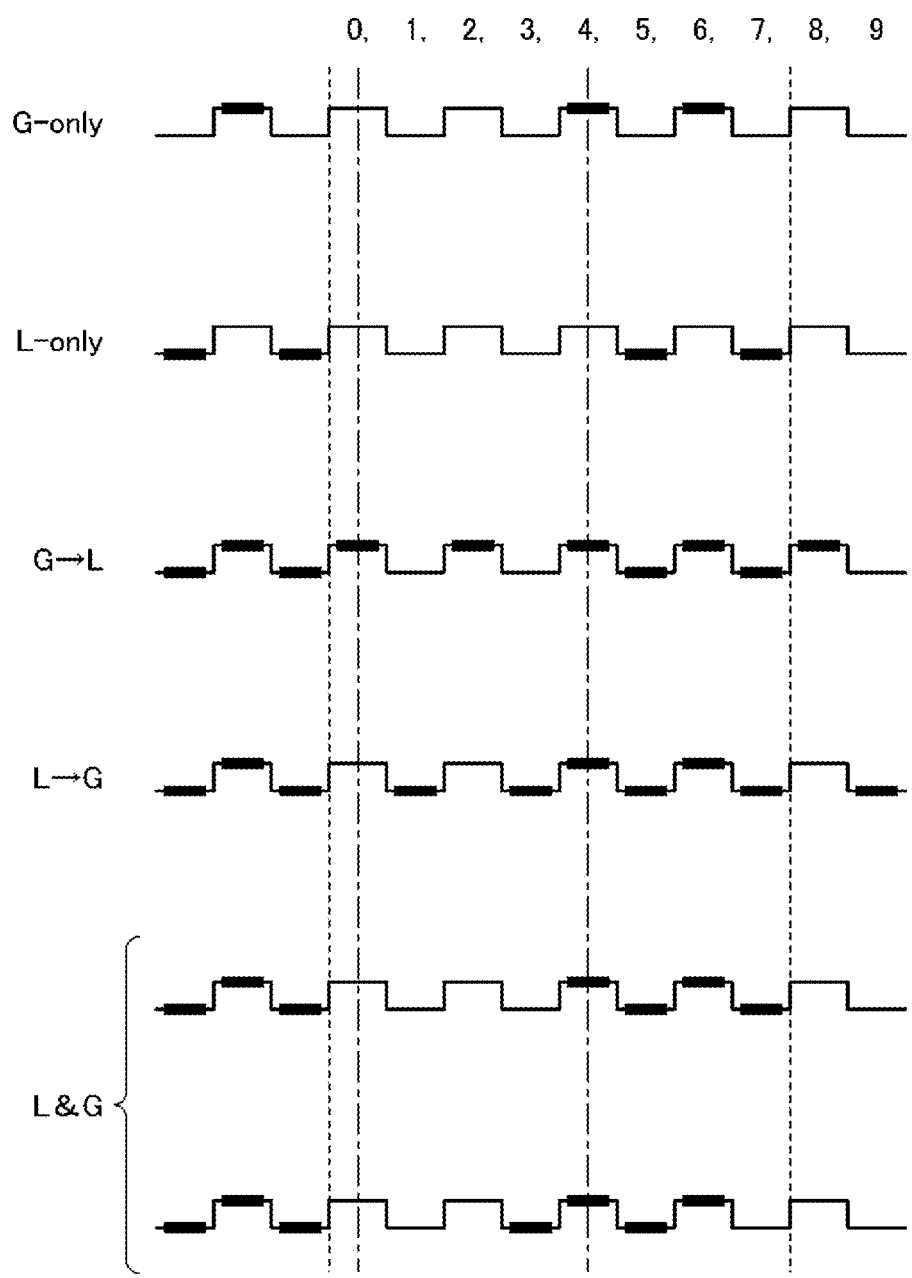
FIG. 14 is a schematic diagram illustrating a plurality of patterns of a recording state of a land/groove recording method.

In a case in which grooves and lands are alternately formed on the optical disc, recording can be performed on both the grooves and the lands, and the track pitch is narrow as illustrated in FIG. 14, adjacent tracks other than its own track are also scanned by the beam spots. For example, in the case of the recorded track, the reflectance decreases. Therefore, the push-pull signal is influenced by the non-recorded/recorded state, and as a result, the offset may occur. In one embodiment of the present disclosure described above, it is possible to prevent or reduce the occurrence of an offset caused by non-recorded/recorded.

A grooved part is referred to as "groove" and a track formed of a groove is referred to as "groove track". The groove is defined as a part irradiated with laser light when an optical disc is produced. An area between adjacent grooves is referred to as "land", and a track formed of a land is referred to as "land track". FIG. 14 illustrates a cross section of the optical disc in the radial direction, and a convex side when viewed from the laser light incident side is referred to as a "groove," and a concave side is referred to as a "land."

There are five types illustrated in FIG. 14 as a type of non-recorded/recorded. For example, a recorded state (indicated by a bold line) or a non-recorded state is indicated for each of tracks to which numbers 0 to 9 are added. There are the following states in order from the upper side of FIG. 15.

"G only": A state in which only the groove is recorded. "L only": A state in which only land is recorded. "G→L": Recording is performed on all the grooves in a certain range, and recording is performed on some lands. "L→G": Recording is done for all lands in a certain range, and recording is performed on some grooves. "LG": Both of a plurality of consecutive lands and groups are in the non-recorded state, and both a plurality of lands and groups are in the recorded state. There are two states as this state: a case in which the recorded track starts from the group and a case in which the recorded track starts from the land.

Figure 15:
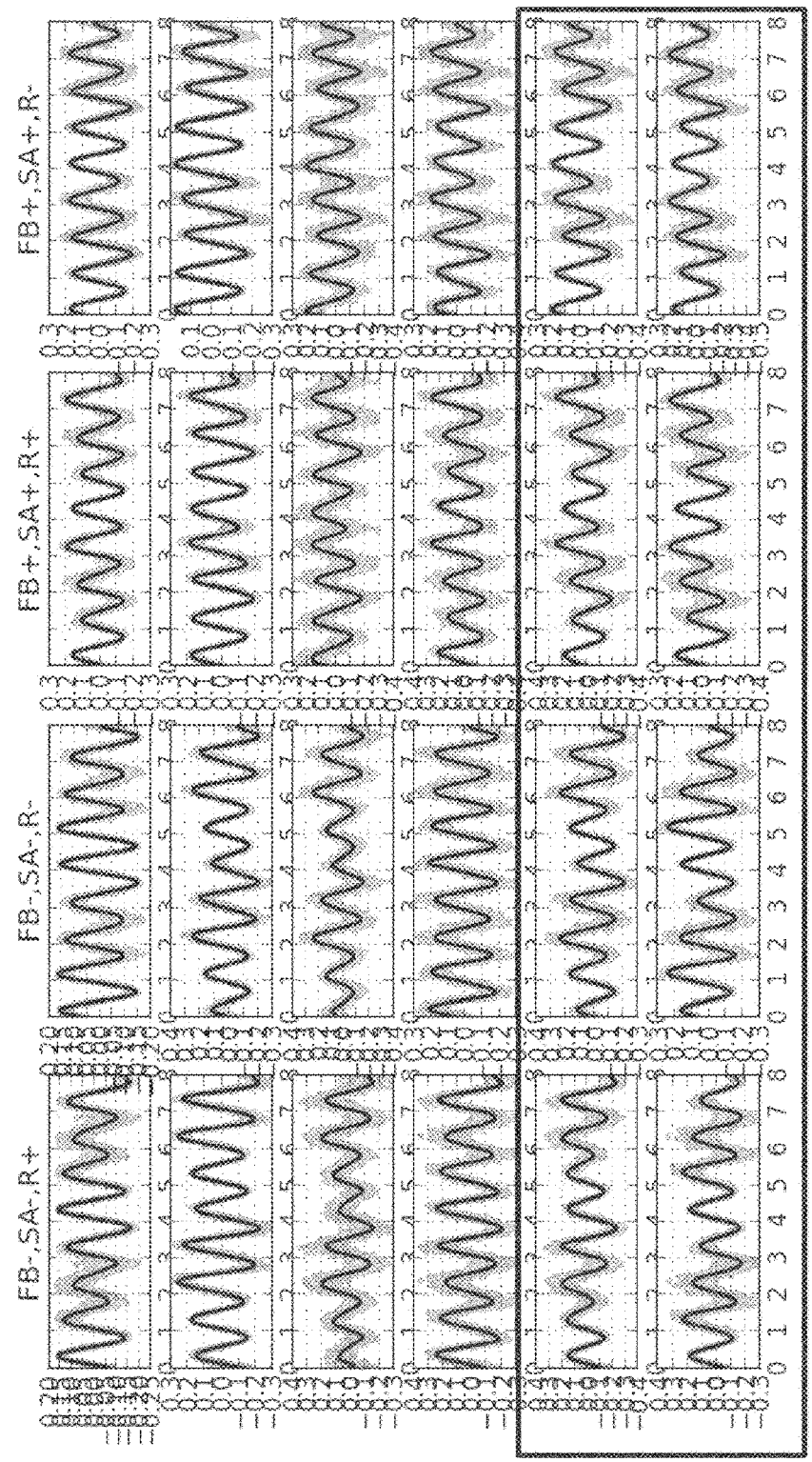
FIG. 15 is a schematic diagram illustrating a push-pull signal for a non-recorded/recorded state in a case in which a push-pull method for a BD is used.
Figure 16:
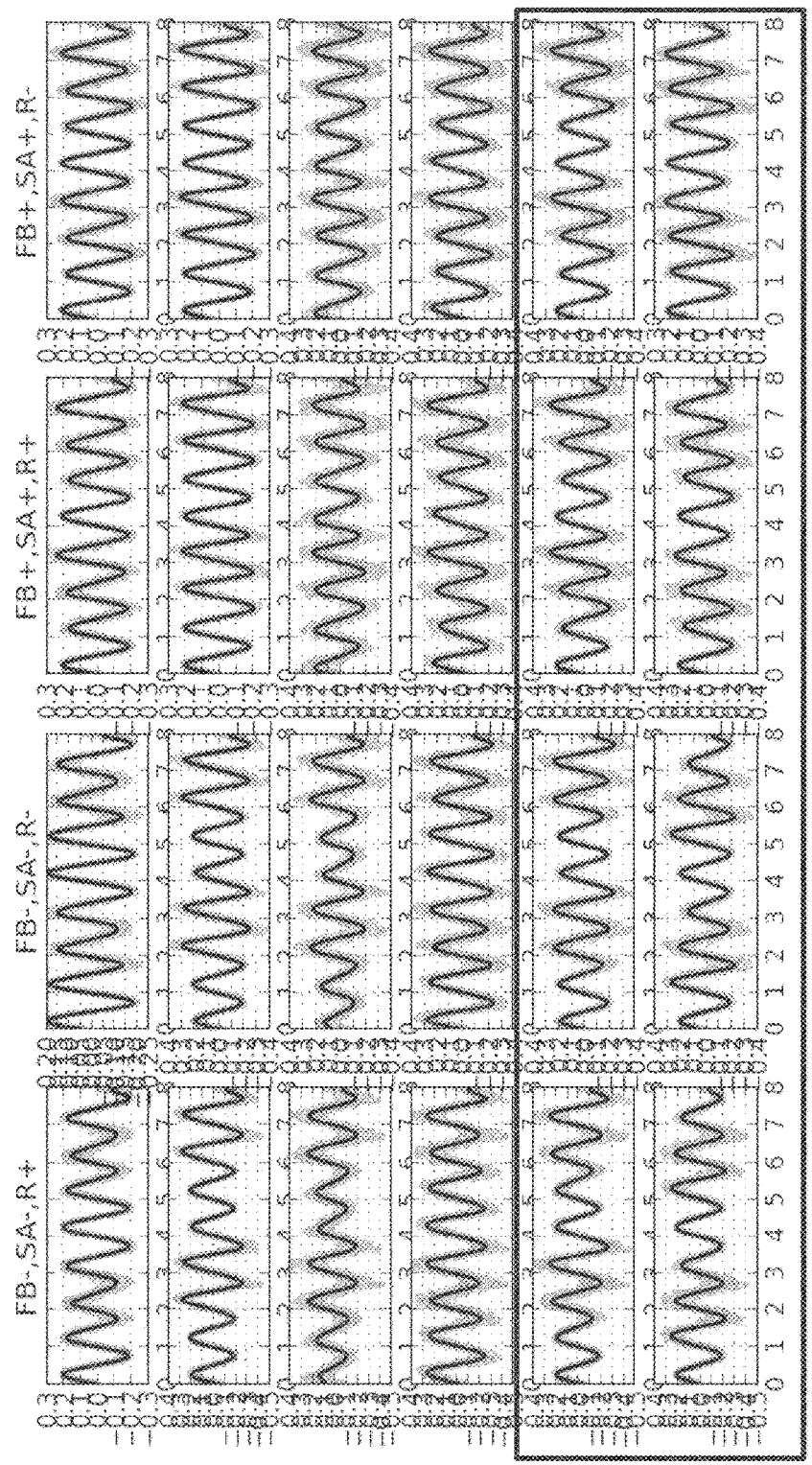
FIG. 16 is a schematic diagram illustrating a push-pull signal for a non-recorded/recorded state in a case in which a push-pull method according to the present disclosure is used.

The push-pull signals in a case in which the optical pickup is moved in the radial direction of the optical disc in connection with the non-recorded/recorded states illustrated in FIG. 14 are illustrated in FIGS. 15 and 16. FIG. 15 is a simulation result in a case in which the existing APP method for the BD having the configuration disclosed in Patent Literature 3 is used. FIG. 16 is a simulation result in a case in which one disclosure (the pattern IVSP4) of the present disclosure is used.

In the above example, the wavelength $\lambda$=405 nm, NA=0.85, the groove pitch 0.45 µm, the groove depth ($1/16$)$\lambda$, Klg1=1, Klg2=0.3, Kls=1, and Kt=4.5 (in this case, Kt is a numerical value in a case in which the light amount proportion and an electrical gain ratio of two optical paths are corrected so that the signal amounts of the respective optical paths can be dealt equivalently).

FIGS. 15 and 16 illustrate the tracking error signals (corresponding to eight sets of lands and grooves) for the above-described six non-recorded/recorded states in connection with four kinds of perturbations. In other words, waveforms of six types of push-pull signals are illustrated in the vertical direction, and waveforms of fourth types of push-pull signals are illustrated in the horizontal direction. The RF signal reproduced from the recorded track is superimposed on the push-pull signal.

The non-recorded/recorded states are arranged in order from the top, similarly to FIG. 14. In other words, the non-recorded/recorded states are arranged in the order of "G only," "L only," "G to L," "L to G," and "LG" (two). An example of specific values of four types of perturbation is as follows.

Defocus FB (+/−)=(+/−)0.1 µm, spherical aberration SA (+/−)=(+/−)3 µm, a radial tilt R (+/−)=(+/−)0.25 deg (a radial tilt with respect to the recording layer at a position of 100 µm from the disc surface), and the lens shift: 10% of the diameter of the objective lens.

In FIGS. 15 and 16, simulation results for the types of perturbation to be described below are illustrated in order from the left to the right in the drawings. (FB−, SA−, R+) (FB−, SA−, R−) (FB+, SA+, R+) (FB+, SA+, R−)

FB and SA having the less favorable offset characteristics are illustrated.

In a case in which a positive part and a negative part of one cycle of a sinusoidal (or S-shaped) push-pull signal have the same amplitude (target), it means that there is no offset. Therefore, it can be seen from the results of FIG. 15 and FIG. 16 that the offset can be reduced by the method according to one embodiment of the present disclosure. The offset improvement results obtained from the simulation results are shown in Table 1 below.

TABLE 1

|  | APP for BD | APP for LG | IVSP-PP |
| --- | --- | --- | --- |
| G-only | 15.8% | 12.9% | 8.8% |
| L-only | 15.3% | 12.7% | 9.6% |
| G→L | 22.3% | 19.9% | 14.9% |
| L→G | 13.5% | 12.5% | 8.0% |
| LG | 27.0% | 21.7% | 13.6% |

Figure 17:
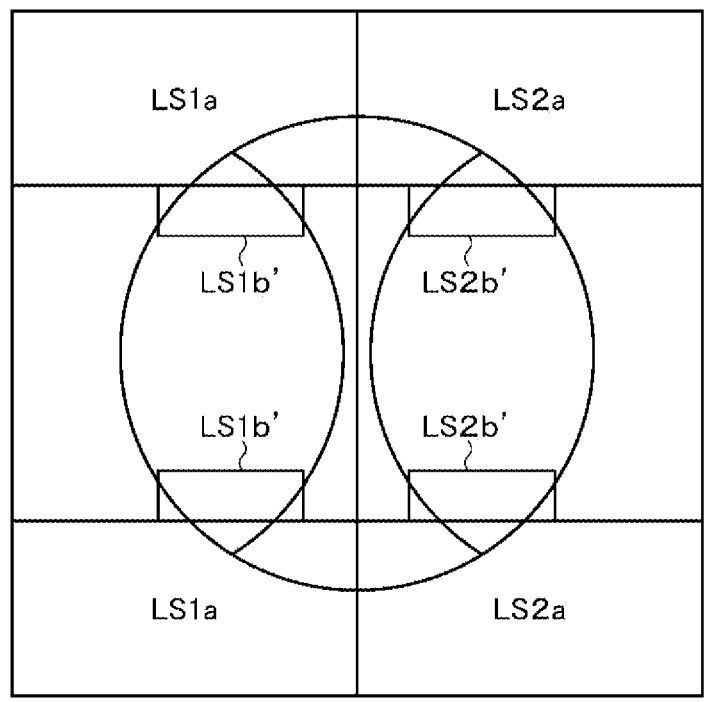
FIG. 17 is a schematic diagram illustrating a splitting pattern for lens shift detection.

Regions for the lens shift detection may be arranged as illustrated in FIG. 17. In other words, regions LS1$a$ and LS2$a$ are located in upper and lower portions in the tangential direction, and regions LS1$b'$ and LS2$b'$ are located inside thereof. If the regions illustrated in FIG. 17 are compared with the regions LS1b and LS2b in the pattern illustrated in FIG. 13B, the width is larger, and the length in the radial direction is shorter. The push-pull signal is formed by performing a similar process as that in the above-described embodiment using the regions for the lens shift detection. Accordingly, they are illustrated in FIG. 11.

$$(x,y)=(\pm k/2, \pm\sqrt{(8-3k^2)/12})$$ [Math. 17]

In other words, it is possible to prevent a reduction in lens shift detection sensitivity by LS1a and LS2a while more effectively including the region including (x, y)=((+/−)0.53, (+/−)0.62) in the simulation condition, that is, the regions PP(s) and PP(t) of FIG. 12.

"Example of Region Splitting Pattern"

Figure 18:
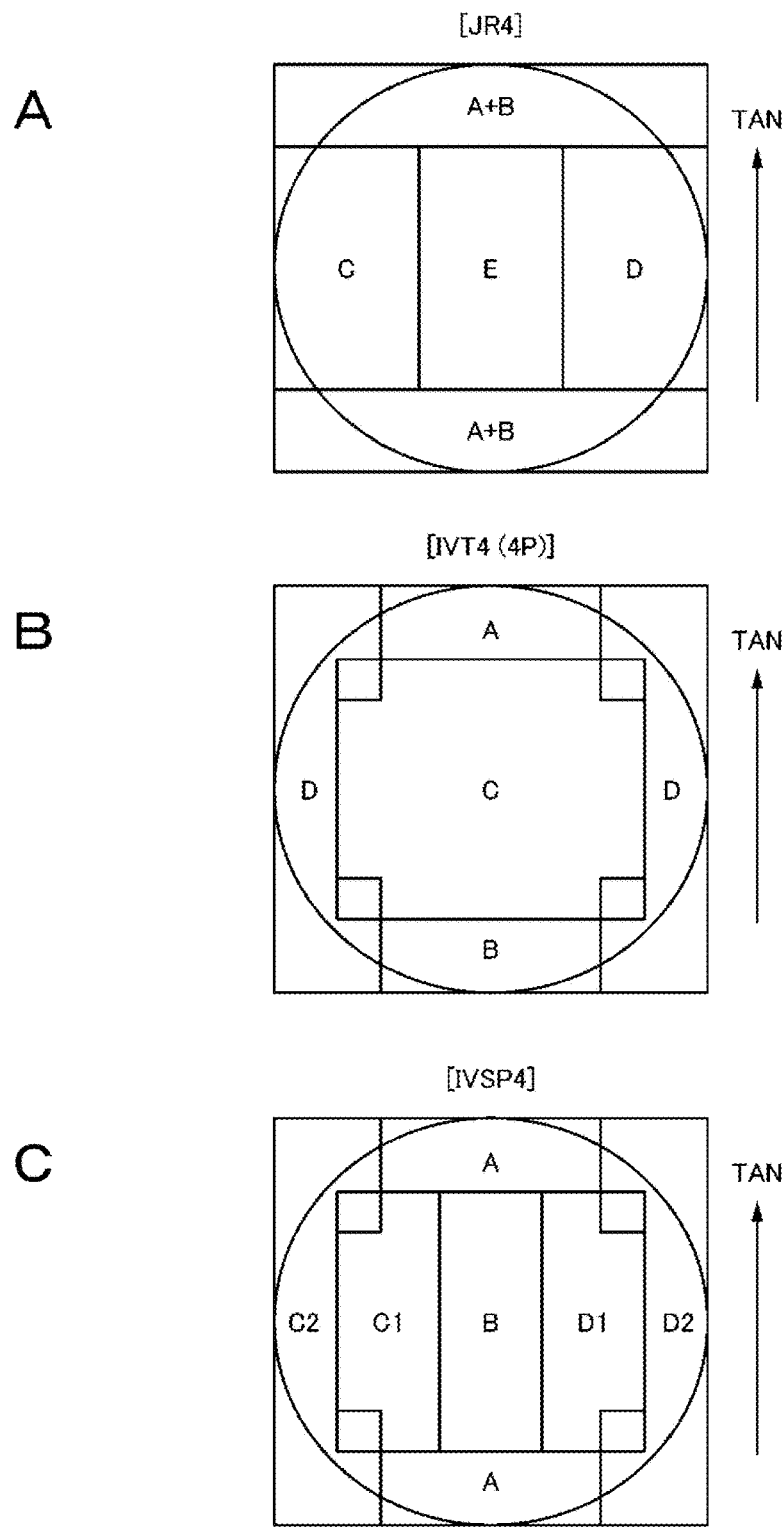
FIG. 18 is a schematic diagram used for describing a region splitting pattern.

FIG. 18A illustrates a pattern corresponding to the signals of 4 ch corresponding to the AERO technique in connection with JR4A illustrated in FIG. 2. FIG. 18B illustrates a pattern in which a rectangular region at the center in the pattern (referred to as IVSP4) according to one embodiment of the present disclosure illustrated in FIG. 18C (FIG. 13A) is not split and used as one region C, and regions A and B split vertically in the tangential direction and two regions D split in the radial direction are set. This pattern is referred to as "IVT 4."

"Simulation Result"

FIGS. 19 to 22 illustrate results of bottom/margin comparison by a simulation. The simulation condition is as follows. Tp=0.225 µm (each of a land and a groove), NA=0.85 PR (1233321), evaluation index: e-MLSE, groove depth (1/16)λ

Figure 19:
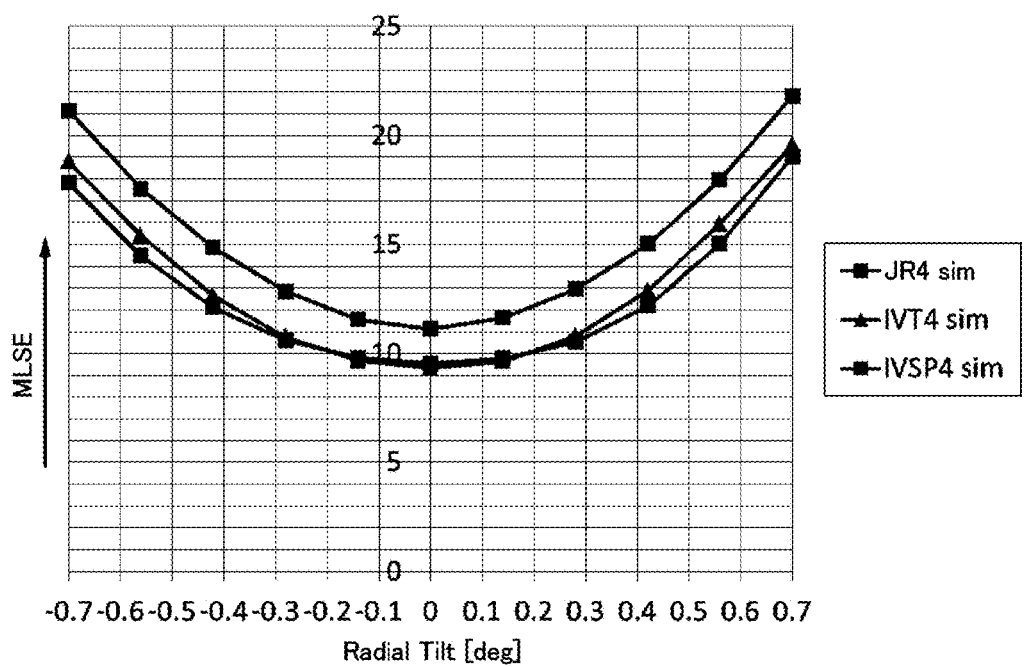
FIG. 19 is a graph illustrating a relation between radial tilt and an evaluation index value in connection with a plurality of region splitting patterns.

Signal recording density LD 35.18 GB (53 nm/channel bit) 50.0 GB/layer, and equivalent to 300 GB in six layers on both sides Mark width=Tp×0.8, and there are disc noise and amplifier noise Tap 1T interval 31 taps FIG. 19 illustrates a simulation result in which a horizontal axis indicates the radial tilt amount, and a vertical axis indicates the evaluation index value MLSE in connection with the above-described two patterns and JR4A illustrated in FIG. 2. The patterns IVT 4 and IVSP 4 have better characteristics than the pattern JR4A.

Figure 20:
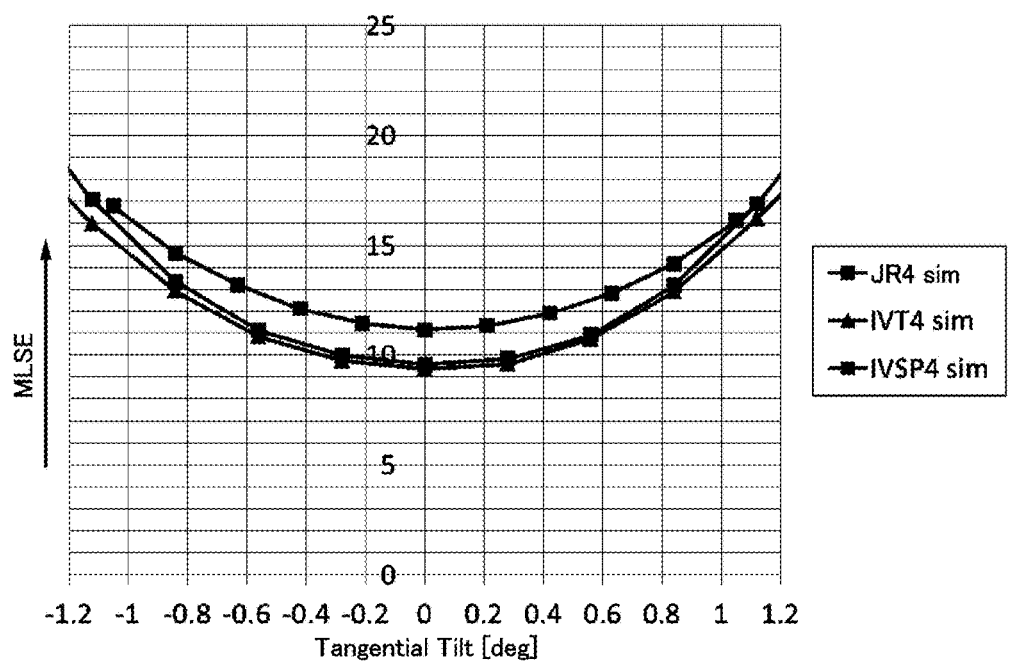
FIG. 20 is a graph illustrating a relation between tangential tilt and an evaluation index value in connection with a plurality of region splitting patterns.

FIG. 20 illustrates a simulation result in which a horizontal axis indicates the tangential tilt amount, and a vertical axis indicates the evaluation index value MLSE in connection with the above-described three patterns. The patterns IVT 4 and IVSP 4 have better characteristics than the pattern JR4A.

Figure 21:
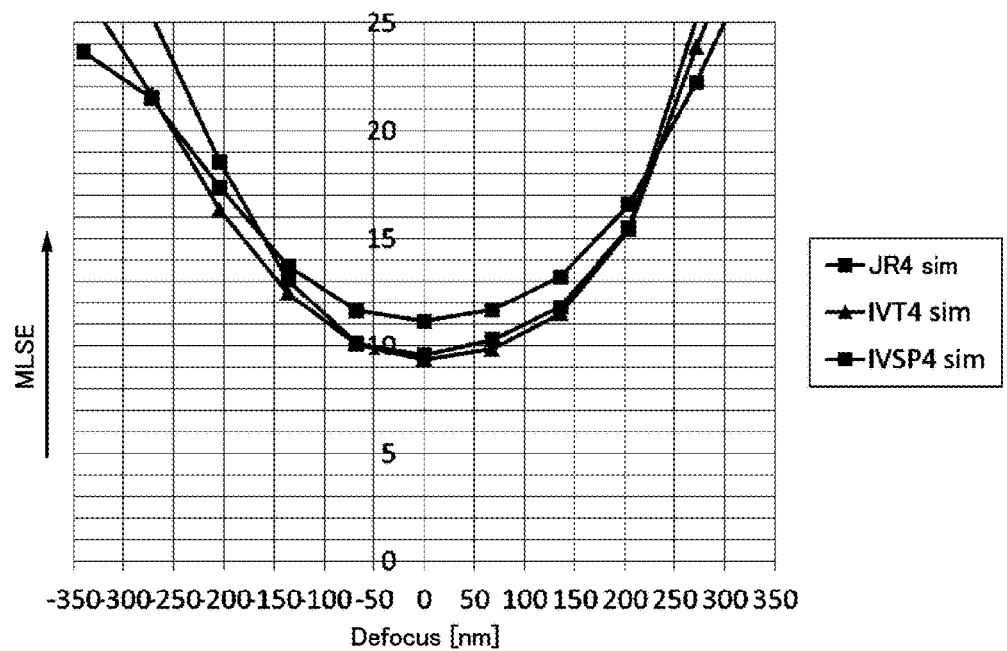
FIG. 21 is a graph illustrating a relation between a defocus amount and an evaluation index value in connection with a plurality of region splitting patterns.

FIG. 21 illustrates a simulation result in which a horizontal axis indicates the defocus amount, and a vertical axis indicates the evaluation index value MLSE(i-MLSE) in connection with the above-described three patterns. The patterns IVT 4 and IVSP 4 have better characteristics than the pattern JR4A.

Figure 22:
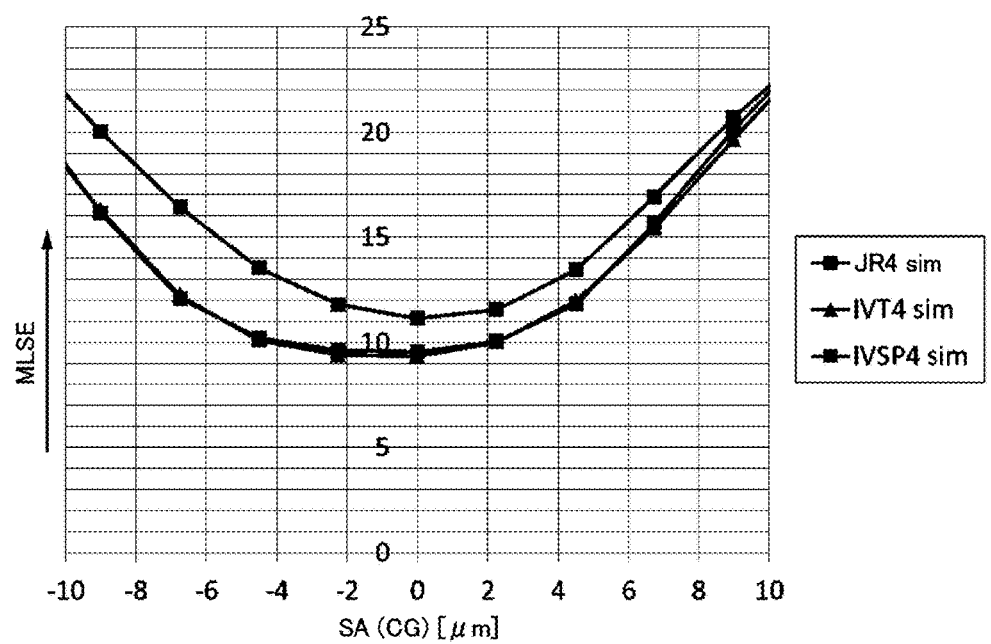
FIG. 22 is a graph illustrating a relation between a spherical aberration and an evaluation index value in connection with a plurality of region splitting patterns.

FIG. 22 illustrates a simulation result in which a horizontal axis indicates the spherical aberration (SA), and a vertical axis indicates the evaluation index value MLSE in connection with the above-described three patterns. The patterns IVT 4 and IVSP 4 have better characteristics than the pattern JR4A.

"Configuration of Optical Pickup"

Figure 23:
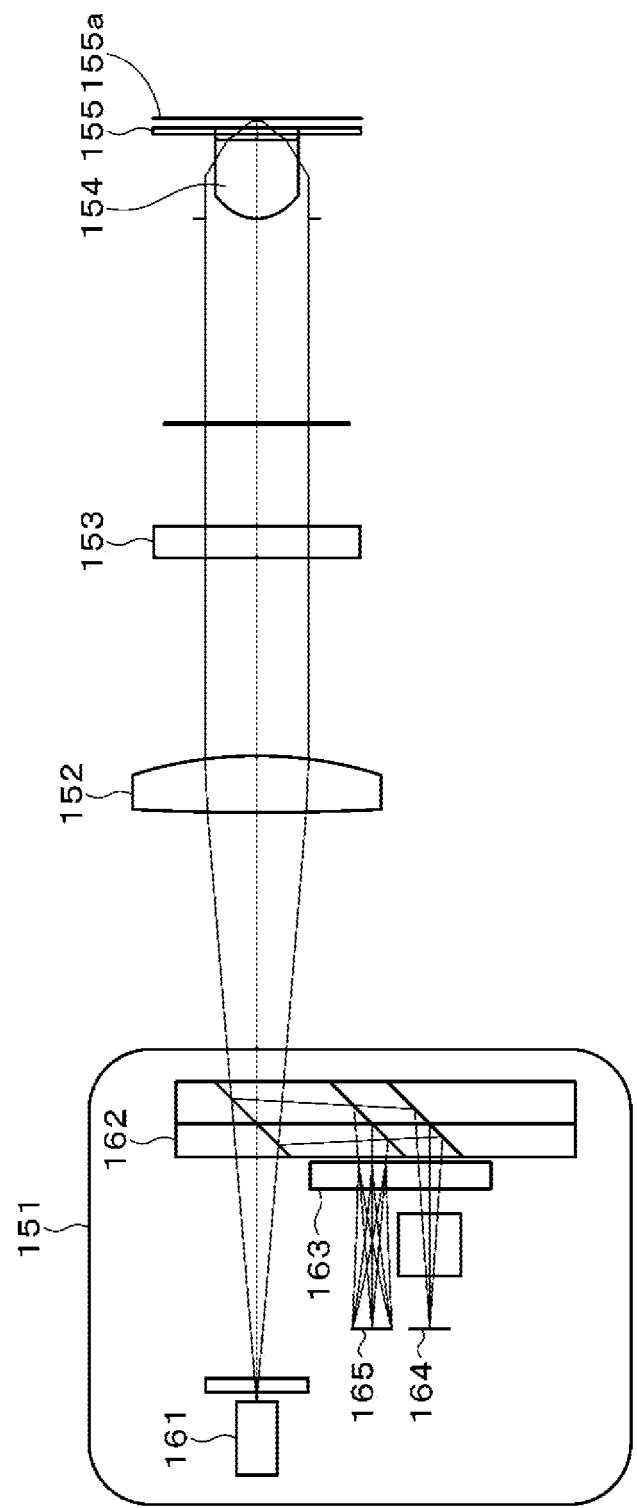
FIG. 23 is a schematic diagram illustrating an overall configuration of a pickup.

An example of the optical pickup will be described with reference to FIG. 23. A light beam emitted from the inside of an optical integrated element 151 is incident on a collimator lens 152 and then converted from a diverging light to substantially parallel light by the collimator lens 152. Conversion from linearly polarized light to circularly polarized light is performed through a λ/4 plate 153, and the circularly polarized light is incident on a recording surface 155a of an optical disc 155 via an objective lens 154. A returning light from the recording surface 155a of the optical disc 155 is converted from circularly polarized light to linearly polarized light through the λ/4 plate 153 and then incident on the optical integrated element 151 through the collimator lens 152.

Figure 24:
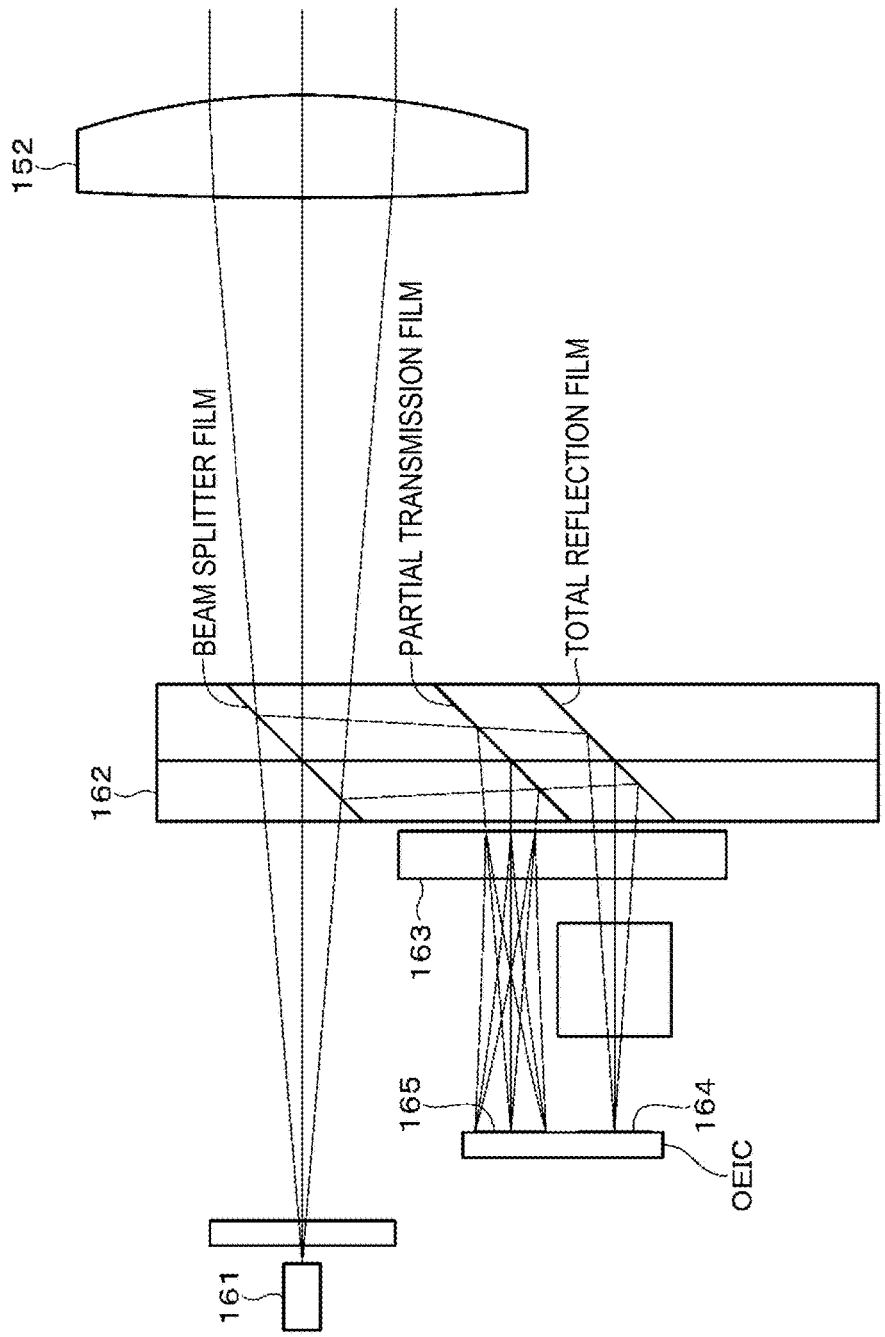
FIG. 24 is an enlarged schematic diagram illustrating a configuration of a portion of an optical integrated element.

As also illustrated in FIG. 24, the optical integrated element 151 includes a laser diode 161, a beam splitter 162, a spectroscopic element 163 such as a hologram element or a liquid crystal, and light receiving surfaces 164 and 165 of an optical electrical integrated circuit (OEIC). A beam splitter 162 partially reflects recording/reproducing light and guides the recording/reproducing light to a light receiving element (not illustrated) for laser power control.

The returning light is totally reflected by a beam splitter film of the beam splitter 162, further split into 2 optical paths by a partial transmission film and a total reflection film of the beam splitter 162, and then incident on the spectroscopic element 163. The spectroscopic element 163 is one of spectroscopic elements and has the pattern for the RF signal and the pattern for the lens shift detection described above. Each component split by the pattern for the RF signal is incident on the light receiving surface 164, and each component split by the pattern for lens shift detection is incident on the light receiving surface 165.

The pattern for the RF signal of the spectroscopic element 163 splits the light passing through each of the six regions (A, B, C1, C2, D1, and D2) illustrated in FIG. 13A to be incident on the light receiving surface 164. The pattern for lens shift detection of the spectroscopic element 163 splits the light passing through each of the eight regions LS1a to LS2b illustrated in FIG. 13B to be incident on the light receiving surface 165.

A light detecting element is disposed on each of the light receiving surfaces 164 and 165, and each split light is incident on the light detecting element and converted into an electric signal corresponding to light intensity in each region.

FIG. 25B is a contour diagram illustrating a change in i-MLSE when the radial tilt occurs and when the detrack amount is changed in the splitting pattern of FIG. 13 using the optical pickup having the above configuration, practically, in a disc in which Tp=0.225 µm (each of the land and the groove), NA=0.85 PR (1233321), the groove depth (1/16)λ the signal recording density LD 35.18 GB (53 nm/channel bit), 50.0 GB/layer, and 300 GB in six layers on both sides. An experimental result in a case in which tracking error signal detection is performed by the configuration of the APP for the BD for the purpose of comparison is also illustrated in FIG. 25A.

As clear from the graph, it is understood that in the configuration of the APP for the BD, a detrack of 10 nm occurred for a radial tilt of 0.1 deg, whereas according to the configuration of the present disclosure, little detrack occurs when the radial tilt occurs. More accurately, the detrack amount following the detrack amount optimal for i-MLSE after the AERO operation according to the radial tilt as illustrated in FIG. 9 is realized by the optimization of Klg and Kls.

In a case in which Klg and, Kls are optimized at the time of reproduction, a slight detrack optimal for RF occurs when the radial tilt occurs. Therefore, different Klg and Kls may be set so that the radial tilt is closer to 0 at the time of recording.

Further, in the multilayer discs, since the occurred coma aberration amount differs depending on a layer even though the radial tilt is the same, a priority of radial tilt resistance differs from a priority of resistance against a signal offset in the recording/non-recording boundary portion. Therefore, Klg and Kls may be set to be different depending on the layer.

3. Modification Example

Embodiments of the present disclosure have been specifically described in the above description. However, the present disclosure is not limited to the above embodiments, and various modifications based on the technical thoughts of the present disclosure can be implemented. For example, the region splitting pattern may be switched in accordance with the type of optical disc, for example, whether or the disc is a BD or a high density disc, and an operation according to the pattern may be performed. Further, as the index for evaluating the reproduction performance, an index other than the above index may be used. Furthermore, the present disclosure is applicable to an optical disc device that performs only one of recording and reproduction on an optical disc.

Also, the configurations, methods, processes, shapes, materials and numerical values described in the above embodiments can be combined with each other as long as the gist of the present disclosure is not departed.

REFERENCE SIGNS LIST 13 multi-input adaptive equalizer
14 binarization detector
15 PR convolution unit
21 to 23 adaptive equalizer unit
100 optical disc
101 optical pickup
105 data detection processing unit
151 optical integrated element
163 spectroscopic element

The invention claimed is:

1. An optical disc device that records and/or reproduces information on an optical medium in which a guide groove is formed on a signal recording layer, the optical medium being capable of recording information in both a land portion and a groove portion formed by the guide groove, the optical disc device comprising:
   a light source;
   an objective lens configured to condense a light beam radiated from the light source onto the signal recording layer formed on the optical medium;
   an objective lens moving unit configured to move the objective lens in a tracking direction;
   an optical splitting element configured to split a luminous flux of a light beam reflected by the optical medium into a plurality of regions;
   a light detecting unit configured to receive each of light beams corresponding to the plurality of regions split by the optical splitting element and generate a light reception signal;
   a control signal generating unit configured to generate a tracking error signal indicating a deviation amount between a condensing spot on the signal recording layer and the guide groove in the tracking direction on the basis of a signal from the light detecting unit; and
   a servo control unit configured to move the objective lens in the tracking direction via the objective lens moving unit on the basis of the tracking error signal generated by the control signal generating unit and cause the objective lens to move and track on a desired land portion or groove portion,
   wherein a weighting of a second region among the plurality of regions is larger than a weighting of a first region,
   a weighting of a fourth region is larger than a weighting of a third region, and
   when a groove pitch of the guide groove is represented as Gp, a wavelength of the light beam radiated from the light source is represented as $\lambda$, and a numerical aperture of the objective lens is represented as NA, and
   a radial direction is represented as an x axis, and a tangential direction is represented as a y axis with a returning luminous flux serving as a unit circle having a radius of 1, and a center of a position on the returning luminous flux serving as an origin,
   the first region is a region including $$(x,y)=(+k/2,0) \quad [\text{Math. 1}]$$

expressed using $k=\lambda/(NA \cdot Gp)$,
   in other words, the first region is a region including a center of a region in which 0th-order light and +1st-order light diffracted by the guide groove overlap,
   the second region is a region including one or both of $$(x,y)=(+k/2,+\sqrt{(8-3k^2)/12}) \quad [\text{Math. 2}]$$

and $$(x,y)=(+k/2,-\sqrt{(8-3k^2)/12}) \quad [\text{Math. 3}]$$

the third region is a region including $$(x,y)=(-k/2,0) \quad [\text{Math. 4}]$$

in other words, the third region is a region including a center of a region in which the 0th-order light and −1st-order light diffracted by the guide groove overlap, and
   the fourth region is a region including one or both of $$(x,y)=(-k/2,+\sqrt{(8-3k^2)/12}) \quad [\text{Math. 5}]$$

and $$(x,y)=(-k/2,-\sqrt{(8-3k^2)/12}). \quad [\text{Math. 6}]$$

2. The optical disc device according to claim 1, wherein the second region and the fourth region are calculated in combination with a lens shift detection region generated using a region whose amount of (+/−)1st-order light diffracted by the guide groove is small.

3. The optical disc device according to claim 1, wherein centers of the second region and the fourth region are set to be further outside in the tangential direction than Maths. 2, 3, 5, and 6.

4. The optical disc device according to claim 1, wherein a luminous flux of a light beam reflected by the optical disc is received and split into a plurality of regions having space-optically different bands in a linear-density direction and/or a track density direction in accordance with respective splitting lines extending in the radial direction and the tangential direction by an optical filter, and
detection signals of a plurality of channels are formed using a plurality of detection signals corresponding to respective light amounts incident on the plurality of regions, and an RF signal is formed in a configuration in which respective electrical filters are supplied with the detection signals of the plurality of channels.

5. The optical disc device according to claim 1, wherein a weighting is performed at a time of reproduction so that an evaluation index value is most favorable, and a different weighting is set at a time of recording so that a detrack is closer to 0 than at the time of reproduction.

6. The optical disc device according to claim 1, wherein, in a multilayer optical disc, a weighting differs depending on a layer.

7. The optical disc device according to claim 1, wherein three or more sets of paired regions in which a differential is taken in the radial direction are included.

* * * * *